United States Patent
Kronfeld et al.

(10) Patent No.: US 12,438,284 B2
(45) Date of Patent: Oct. 7, 2025

(54) APPARATUS, SYSTEM AND METHOD OF COMMUNICATING A MULTIPLE-INPUT-MULTIPLE-OUTPUT (MIMO) TRANSMISSION WITH POLARIZATION

(71) Applicant: Intel Corporation, Santa Clara, CA (US)

(72) Inventors: Ronen Kronfeld, Shoham (IL); Ofir Degani, Nes Ammim (IL); Ashoke Ravi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 869 days.

(21) Appl. No.: 17/356,210

(22) Filed: Jun. 23, 2021

(65) Prior Publication Data

US 2022/0416444 A1 Dec. 29, 2022

(51) Int. Cl.
*H01Q 21/24* (2006.01)
*H04B 7/0413* (2017.01)

(52) U.S. Cl.
CPC ........... *H01Q 21/24* (2013.01); *H04B 7/0413* (2013.01)

(58) Field of Classification Search
CPC .............................. H01Q 21/24; H04B 7/0413
See application file for complete search history.

(56) References Cited

U.S. PATENT DOCUMENTS

| | | | |
|---|---|---|---|
| 7,333,455 B1 * | 2/2008 | Bolt | H04L 1/0618 375/267 |
| 2014/0030979 A1 * | 1/2014 | Bowman | H04B 15/00 455/39 |
| 2015/0123873 A1 * | 5/2015 | Perumana | H01Q 3/24 343/876 |
| 2017/0164215 A1 * | 6/2017 | Chen | H04W 24/02 |
| 2018/0254805 A1 * | 9/2018 | Sadri | H01Q 5/28 |
| 2020/0162146 A1 * | 5/2020 | Park | H04B 7/0417 |
| 2022/0200670 A1 * | 6/2022 | Rahman | H04B 7/0456 |

FOREIGN PATENT DOCUMENTS

JP 2016119603 A * 6/2016

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

*Primary Examiner* — Raymond S Dean
(74) *Attorney, Agent, or Firm* — Shichrur & Co.

(57) ABSTRACT

For example, an apparatus may include a baseband controller configured to control a plurality of dual-polarization Radio Heads (RHs) to communicate a Multiple-Input-Multiple-Output (MIMO) transmission, the baseband controller configured to control a first dual-polarization RH of the plurality of dual-polarization RHs to communicate a first spatial stream of the MIMO transmission with a horizontal-polarization via one or more first dual-polarization antenna elements of the first dual-polarization RH, and to control a second dual-polarization RH of the plurality of dual-polarization RHs to communicate a second spatial stream of the MIMO transmission with a vertical-polarization via one or more second dual-polarization antenna elements of the second dual-polarization RH.

25 Claims, 6 Drawing Sheets

APPARATUS, SYSTEM AND METHOD OF COMMUNICATING A MULTIPLE-INPUT-MULTIPLE-OUTPUT (MIMO) TRANSMISSION WITH POLARIZATION

TECHNICAL FIELD

Aspects described herein generally relate to communicating a Multiple-Input-Multiple-Output (MIMO) transmission with polarization.

BACKGROUND

Increasing demand for wireless data traffic requires wireless transceivers to support wider bandwidths (BW) and higher-order modulations schemes.

A Multiple-Input-Multiple-Output (MIMO) schemes may be implemented to support higher throughputs. The MIMO schemes may require a larger number of wireless transceivers.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
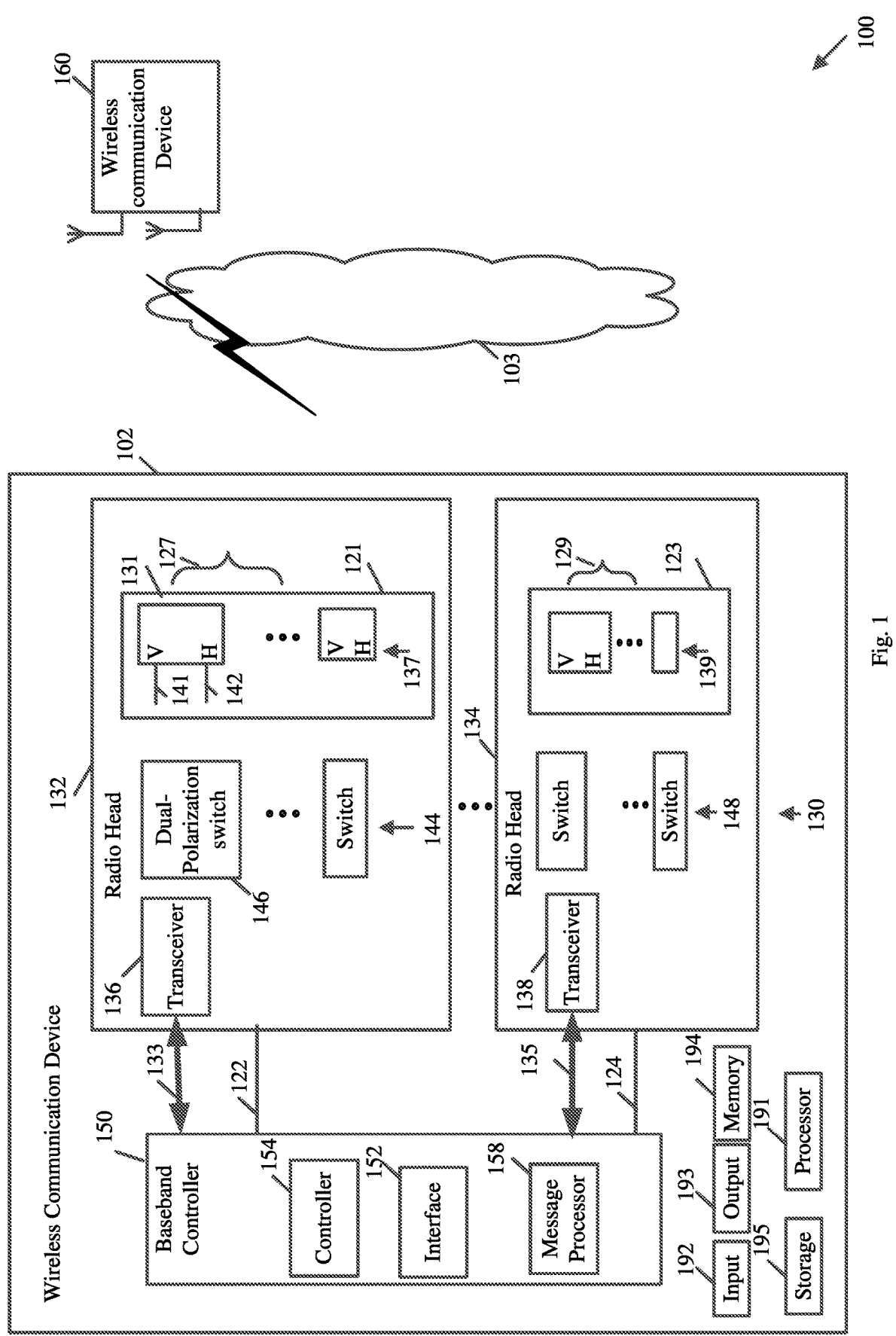
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspects and/or embodiment(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016); and/or IEEE 802.11ay (*P802.11ay/D6.0 Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 7: Enhanced Throughput for Operation in License-Exempt Bands Above 45 GHz*, September 2020)), and/or future versions and/or derivatives thereof, devices and/or networks operating in accordance with existing cellular specifications and/or protocols, e.g., 3rd Generation Partnership Project (3GPP), 3GPP Long Term Evolution (LTE), Fifth Generation (5G) mobile networks, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), a memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a 6-7 GHz band, a WLAN frequency band, a WPAN frequency band, and the like.

The phrases "directional multi-gigabit (DMG)" and "directional band" (DB and), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative aspects may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative aspects.

As shown in FIG. 1, in some demonstrative aspects, system 100 may include a wireless communication network including one or more wireless communication devices, e.g., a wireless communication device 102, and/or at least one wireless communication device 160.

In some demonstrative aspects, wireless communication device 102 and/or device 160 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 and/or device 160 may include, operate as, and/or perform the functionality of one or more STAs. For example, device 102 may include at least one STA, and/or device 160 may include at least one STA.

In some demonstrative aspects, device 102 and/or device 160 may include, operate as, and/or perform the functionality of one or more WLAN STAs.

In some demonstrative aspects, device 102 and/or device 160 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative aspects, devices 102 and/or 160 may include a non-AP STA or an access point (AP) STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects, device 102 and/or device 160 may include, operate as, and/or perform the functionality of, any other devices and/or STAs.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Solid Stata Drive (SSD), a Compact Disk (CD) drive, a CD-ROM drive, a DVD drive, or other suitable removable or non-removable storage units. Memory unit 194 and/or storage unit 195, for example, may store data processed by device 102.

In some demonstrative aspects, wireless communication device 102 may be capable of communicating content, data, information and/or signals via a wireless medium (WM) 103.

In some demonstrative aspects, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative aspects, WM 103 may include one or more directional bands and/or channels. For example, WM 103 may include one or more millimeter-wave (mmWave) wireless communication bands and/or channels.

In some demonstrative aspects, WM 103 may include one or more DMG channels. In other aspects WM 103 may include any other directional channels.

In other aspects, WM 103 may include any other type of channel over any other frequency band.

In some demonstrative aspects, device 102 and/or device 160 may include, operate as, perform the role of, and/or perform one or more functionalities of, one or more STAs.

In some demonstrative aspects, device 102 and/or device 160 may form, or may communicate as part of, a wireless local area network (WLAN).

In some demonstrative aspects, device 102 and/or device 160 may form, or may communicate as part of, a WiFi network.

In other aspects, device 102 and/or device 160 may form, and/or communicate as part of, any other additional or alternative network.

In some demonstrative aspects, devices 102 and/or 160 may be configured to support high demand for wireless data traffic, which may require wireless transceivers to support wider bandwidths (BW), and/or higher-order modulations schemes.

For example, there may be continuous demand to improve power, cost and/or form factor of wireless devices, which may be mobile and battery powered. This demand may be achieved, for example, by high level integration and/or advanced digital Complementary Metal-Oxide-Semiconductor (CMOS) processes.

For example, some WiFi bands, e.g., a Wi-Fi 5-7 GHz band, become more congested, for example, with dense deployment of smart devices, e.g., in home, public and/or office environments. Accordingly, some communication technologies and/or standards may be focused on the mmWave band, for example, to support the ever-increasing demand for data. For example, an available spectrum of a 60 GHz unlicensed-band may be utilized, for example, for global inter-operability and/or propagation properties conducive to dense indoor deployment.

For example, some standards, e.g., IEEE 802.11 ad, IEEE 802.11 ay, and/or 5G new Radio (5G-NR) Standards, have been designed in attempt to use the 60 GHz unlicensed band. However, these standards have not yet been widely adopted, e.g., by clients and/or phone/tablet platforms, for example, due to the high Bill of Material (BOM) cost. For example, cost may be expected to be a serious limitation for future implementations, such as, for example, IoT and/or smart device applications.

For example, one option for communication over the mmWave frequency bands may rely on a plurality of antenna modules, e.g., a plurality of phased array antenna modules, for example, to meet link budgets for range and/or throughput at the mmWave frequency bands.

For example, some technologies, for example, MIMO technologies, e.g., 2×2 MIMO, 3×3 MIMO, 4×4 MIMO or higher order MIMO, multi-radio systems, and/or distributed radio systems, may be utilized to increase data throughput. However, such technologies may rely on a large number of antenna modules.

In some demonstrative aspects, in some use cases, and/or scenarios, there may be a need to address one or more technical issues, for example, when implementing a system including a plurality of antenna modules for MIMO communication, e.g., as described below.

In one example, a 2×2 MIMO implementation in a mmWave antenna module may include a duplication of a number of chains in an RF transceiver, and/or duplication of a digital baseband, which may process multiple spatial streams. For example, this MIMO implementation may increase a silicon area, power consumption, and/or a cost of mmWave antenna modules.

In some demonstrative aspects, a dual-polarization scheme may be implemented for communication in mmWave frequencies, for example, to support polarization diversity. For example, the dual-polarization scheme may include a polarization in a vertical plane (V polarization), and a polarization in a horizontal plane (H polarization), for example, to provide polarization diversity. In one example, the polarization diversity may be utilized, for example, to improve link robustness, e.g., in Non-Line-Of-Sight (NLOS) conditions. In another example, the polarization diversity may be utilized, for example, to support a dual-polarization MIMO communication, e.g., dual-polarization 2×2 MIMO, for example, to support increased data throughputs.

In some demonstrative aspects, in some use cases, and/or scenarios, there may be a need to address one or more technical issues, for example, when implementing a system including a plurality of antenna modules for dual-polarization MIMO communication, e.g., as described below.

In one example, some implementations, e.g., in accordance with an IEEE 802.11ad standard, may use a plurality of antenna modules, for example, for selection of a best antenna module. In these implementations, the dual-polarization may be utilized in a selected antenna module, for example, for diversity. These implementations may not be able to support MIMO transmissions, and, accordingly, may suffer lower throughputs.

In some demonstrative aspects, in some use cases, and/or scenarios, there may be a need to address one or more technical issues, for example, when implementing a system including a plurality of antenna modules, while and using a single antenna module for dual-polarization MIMO communication.

In one example, some implementations may support dual-polarization 2×2 MIMO within a single antenna module. However, these implementations may require a large Silicon area, may have high power consumption, and/or may have a high cost.

For example, in some use cases, implementations, and/or scenarios, it may not be efficient and/or advantageous to utilize a mmWave dual-polarization MIMO system including two or more antenna modules, where each antenna module includes an antenna array including an array of dual-polarization antenna elements, e.g., a 1×4 array or a larger array. For example, in such mmWave dual-polarization MIMO system, each antenna module may include two transceivers with full duplication of Power Amplifiers (PAs), Low Nose Amplifiers (LNAs), Receive and Transmit (Rx/Tx) circuitry, Analog Beamforming (BF) circuitry, and baseband circuitry. For example, each antenna module may include two transceivers, two beamformers, two PAs per each antenna element, and two LNAs per each antenna element.

In one example, such mmWave dual-polarization MIMO system may have a digital interface to interface between each transceiver and a central baseband processor.

In one example, such mmWave dual-polarization MIMO system may be operated by activation of a single antenna module, e.g., a selected antenna module from two or more antenna modules. For example, the single antenna module may be operated by activation of both transceivers of the single antenna module, e.g., one per each polarization and spatial stream.

For example, each antenna module may be required to include two transceivers, two PAs per each antenna element, two LNAs per each antenna element, two BFs, and two interfaces between the two transceivers and the baseband processor, for example, to support the dual-polarization MIMO communication at each antenna module.

Accordingly, the mmWave dual-polarization MIMO system may require antenna modules, which may be large, complicated, and may have high cost.

In some demonstrative aspects, device 102 and/or device 160 may be configured to communicate a MIMO transmission, for example, a dual-polarization MIMO transmission, e.g., as described below.

In some demonstrative aspects, device 102 may include a plurality of dual-polarization Radio Heads (RHs) (also referred to as "antenna modules", "antenna systems", or "antenna units") 130, e.g., as described below.

In some demonstrative aspects, device 102 may include a baseband controller 150 configured to control the plurality of dual-polarization RHs 130 to communicate a MIMO transmission, e.g., as described below.

In some demonstrative aspects, baseband controller 150 may be configured, for example, to generate and/or process one or more signals, and/or to control, trigger and/or cause one or more operations and/or functionalities of device 102, e.g., as described below.

In some demonstrative aspects, baseband controller 150 may include an interface 152 to communicate a plurality of spatial streams of the MIMO transmission with the plurality of dual-polarization RHs 130, e.g., as described below.

In some demonstrative aspects, interface 152 may be configured to utilize a digital link, for example, a high throughput IO link, to interface with the plurality of dual-polarization RHs 130, e.g., as described below. In other aspects, any other interface may be implemented.

In some demonstrative aspects, baseband controller 150 may include a controller 154 configured to control the plurality of dual-polarization RHs 130, for example, to communicate the MIMO transmission, e.g., as described below.

In some demonstrative aspects, controller 154 may be configured to perform and/or to trigger, cause, instruct and/or control baseband controller 150 and/or the plurality of dual-polarization RHs 130 to perform one or more communications, to generate and/or communicate one or more messages and/or transmissions, and/or to perform one or more functionalities, operations and/or procedures, e.g., as described below.

In some demonstrative aspects, controller 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 154. Additionally or alternatively, one or more functionalities of controller 154 may be implemented by logic, which may be executed by a machine and/or one or more processors, e.g., as described below.

In one example, controller 154 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, baseband controller 150 may include a message processor 158 configured to generate, process and/or access one or more messages communicated by device 102.

In one example, message processor 158 may be configured to generate one or more messages to be transmitted by device 102, and/or message processor 158 may be configured to access and/or to process one or more messages received by device 102, e.g., as described below.

In one example, message processor 158 may include at least one first component configured to generate a message, for example, in the form of a frame, field, information element and/or protocol data unit, for example, a MAC Protocol Data Unit (MPDU); and/or at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message. In other aspects, message processor 158 may be configured to perform any other additional or alternative functionality and/or may include any other additional or alternative components to generate and/or process a message to be transmitted.

In some demonstrative aspects, message processor 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 158, respectively. Additionally or alternatively, one or more functionalities of message processor 158 may be implemented by logic, which may be executed by a machine and/or one or more processors, e.g., as described below.

In some demonstrative aspects, at least part of the functionality of message processor 158 may be implemented as part of controller 154.

In other aspects, the functionality of message processor 158 may be implemented as part of any other element of baseband controller 150.

In some demonstrative aspects, at least part of the functionality of baseband controller 150 may be implemented by an integrated circuit, for example, a chip, e.g., a System on Chip (SoC). In one example, the chip or SoC may be configured to perform one or more functionalities of baseband controller 150. For example, the chip or SoC may include one or more elements of controller 154, one or more elements of message processor 158, and/or one or more elements of interface 152. In one example, controller 154, message processor 154, and interface 152 may be implemented as part of the chip or SoC.

In some demonstrative aspects, device 102 may be configured according to a dual-polarization MIMO architecture, which may be configured to provide one or more technical solutions and/or advantages, e.g., as described below.

In one example, the dual-polarization MIMO architecture may include a cost-effective mmWave dual-polarization 2×2 MIMO architecture, using the plurality of dual-polarization RHs 130, for example, two or more dual-polarization antenna modules, e.g., as described below.

In one example, an RH, e.g., each RH of the plurality of dual-polarization RHs 130, may be configured to support a single spatial stream having a selected polarization, for example, a horizontal-polarization or a vertical-polarization, e.g., as described below.

In some demonstrative aspects, the dual-polarization MIMO architecture may be implemented with reduced area, low cost, and/or may utilize a low interface bandwidth to baseband processor 154, e.g., as described below.

In some demonstrative aspects, baseband controller 150 may be configured to control the plurality of dual-polarization RHs 130 to communicate the MIMO transmission, for example, by controlling activation of the plurality of dual-polarization RHs 130. For example, baseband controller 150 may be configured to control a first RH of the plurality of dual-polarization RHs 130 to use the vertical-polarization, and a second RH of the plurality of dual-polarization RHs 130 to use the horizontal-polarization, e.g., as described below.

In some demonstrative aspects, baseband controller 150 may be configured to select a polarization mode for an RH of the plurality of dual-polarization RHs 130 based on one or more criteria, e.g., relating to the MIMO transmission, e.g., as described below.

In some demonstrative aspects, baseband controller 150 may be configured to select the polarization mode for the RH, for example, such that a Signal To Noise Ratio (SNR) of a relevant spatial stream to be communicated via the RH may be maximized, e.g., as described below. In other aspects, any other additional or alternative criteria may be utilized.

In some demonstrative aspects, the dual-polarization MIMO architecture may be configured to provide improved MIMO performance, for example, in low cross-polarization channels, e.g., line-of-sight or near line-of-sight channels, as described below.

In some demonstrative aspects, the dual-polarization MIMO architecture may support communication according to a Single-input-Single-Output (SISO) scheme, for example, at a 1×1 SISO mode, e.g., as described below.

In some demonstrative aspects, baseband controller 150 may determine a selected RH of the plurality of dual-polarization RHs 130 to be used for the SISO communication, e.g., as described below.

For example, baseband controller 150 may determine the selected RH for the SISO communication to include a best RH of the plurality of dual-polarization RHs 130, which maximizes the SNR, e.g., as described below. In other aspects, any other additional or alternative criteria may be utilized for selection of the RH for the SISO communication.

In one example, the selected RH for the SISO mode may be operated at a single polarization, e.g., the vertical-polarization or the horizontal-polarization, for example, using switched selection diversity, e.g., as described below.

In another example, the selected RH for the SISO mode may be operated at a dual-polarization utilizing both polarizations, e.g., the vertical-polarization and the horizontal-polarization, for example, to provide additional diversity gain, for example, in an Rx mode and/or a Tx mode, e.g., as described below.

In some demonstrative aspects, the dual-polarization MIMO architecture may be configured to support Rx polarization selection, e.g., Rx selection diversity, for selection between vertical-polarization and horizontal-polarization, for example, while operating a selected RH of the plurality of dual-polarization RHs 130, e.g., as described below.

In some demonstrative aspects, the dual-polarization MIMO architecture may be configured to support Tx polarization selection between vertical-polarization and horizontal-polarization, for example, while operating a selected RH for transmission of a MIMO transmission; and to support Rx polarization selection for reception of a MIMO transmission, e.g., as described below.

In some demonstrative aspects, the dual-polarization MIMO architecture may be configured to support a dual-polarization MIMO using the plurality of dual-polarization RHs 130. For example, a 2×2 dual-polarization MIMO may use two RHs, where one RH of the plurality of RHs 130 may be operated at a horizontal-polarization mode, and another RH the plurality of RHs 130 may be operated at a vertical-polarization mode, e.g., as described below.

In some demonstrative aspects, the dual-polarization MIMO architecture may be configured to support a polarization diversity reception mode, e.g., an Rx Maximal Ratio Combining (MRC) (Rx-MRC) mode. In one example, the Rx-MRC mode may be supported by doubling a number of receiver chains, and using analog and/or digital combining, for example, to maximize an Rx SNR, e.g., as described below.

In some demonstrative aspects, the dual-polarization MIMO architecture may utilize phased-array antennas. For example, an RH of RHs 130 may include a phased array antenna including a plurality of antenna elements. The phased array antenna may be configured to steer to a plurality of beam directions.

In some demonstrative aspects, the phased array antenna may be utilized in the Rx MRC mode, for example, to point a vertical-beam and a horizontal-beam at different directions, e.g., as described below.

In some demonstrative aspects, the dual-polarization MIMO architecture may be implemented to provide a technical solution to reduce size, power consumption and/or cost of one or more, e.g., some or all, of dual-polarization RHs 130, e.g., as described below.

In some demonstrative aspects, the dual-polarization MIMO architecture may be implemented to provide a technical solution to reduce throughput requirements on interface 152 between the plurality of dual-polarization RHs 130 and the baseband controller 150, e.g., as described below.

In some demonstrative aspects, the dual-polarization MIMO architecture may be implemented to provide a technical solution to support dual-polarization MIMO communication and/or dual-polarization SISO communication in a transparent manner. For example, a peer wireless communication device, e.g., an Access Point or Base Station of the networking system, for example, device 160, may be indifferent to the dual-polarization MIMO architecture implemented by device 102, e.g., as described below.

In some demonstrative aspects, the plurality of dual-polarization RHs 130 may include a first dual-polarization RH 132, and a second dual-polarization RH 134, e.g., as described below.

In some demonstrative aspects, a dual-polarization RH of the plurality of dual-polarization RHs 130, e.g., dual-polarization RH 132 and/or dual-polarization RH 134, may include a transceiver configured to communicate a spatial stream of a MIMO transmission, for example, with device 160, e.g., as described below.

In some demonstrative aspects, first dual-polarization RH 132 may include a first transceiver 136 configured to communicate a first spatial stream 133 of the MIMO transmission, e.g., as described below.

In some demonstrative aspects, second dual-polarization RH 134 may include a second transceiver 138 configured to communicate a second spatial stream 135 of the MIMO transmission, e.g., as described below.

In some demonstrative aspects, a dual-polarization RH of the plurality of dual-polarization RHs 130, e.g., dual-polarization RH 132 and/or dual-polarization RH 134, may include a plurality of dual-polarization antenna elements, e.g., as described below.

In some demonstrative aspects, first dual-polarization RH 132 may include a plurality of dual-polarization antenna elements 137, e.g., as described below.

In some demonstrative aspects, first dual-polarization RH 132 may include an antenna array 121 including the plurality of dual-polarization antenna elements 137, e.g., as described below.

In some demonstrative aspects, second dual-polarization RH 134 may include a plurality of dual-polarization antenna elements 139, e.g., as described below.

In some demonstrative aspects, second dual-polarization RH 134 may include an antenna array 123 including the plurality of dual-polarization antenna elements 139, e.g., as described below.

In one example, antenna arrays 121 and/or 123 may include any type of antennas suitable for transmitting and/or receiving wireless communication signals, blocks, frames, transmission streams, packets, messages and/or data. For example, antenna arrays 121 and/or 123 may include any suitable configuration, structure and/or arrangement of one or more antenna elements, components, units, assemblies and/or arrays. In some aspects, antenna arrays 121 and/or 123 may implement transmit and receive functionalities using separate transmit and receive antenna elements. In some aspects, antenna arrays 121 and/or 123 may implement transmit and receive functionalities using common and/or integrated transmit/receive elements.

In some demonstrative aspects, a dual-polarization antenna element of the plurality of dual-polarization antenna elements 137 and/or 139 may include a vertical-polarization port and a horizontal-polarization port. For example, a dual-polarization antenna element 131 of the plurality of dual-polarization antenna elements 137 may include a vertical-polarization (V) port 141 and a horizontal-polarization (H) port 142, e.g., as described below.

In some demonstrative aspects, a dual-polarization RH of the plurality of dual-polarization RHs 130 may include a plurality of dual-polarization switches, e.g., as described below.

In some demonstrative aspects, first dual-polarization RH 132 may include a plurality of dual-polarization switches 144, e.g., as described below.

In some demonstrative aspects, second dual-polarization RH 134 may include a plurality of dual-polarization switches 148, e.g., as described below.

In some demonstrative aspects, a dual-polarization switch 146 of the plurality of dual-polarization switches 144 may be configured to route a vertical-polarization transmission between the transceiver 136 and the vertical-polarization port 141 of the dual-polarization antenna element 131, and/or to route a horizontal-polarization transmission between the transceiver 136 and the horizontal-polarization port 142 of the dual-polarization antenna element 131, e.g., as described below.

In some demonstrative aspects, a dual-polarization switch of the plurality of dual-polarization switches 148 may be configured to route a vertical-polarization transmission between the transceiver 138 and a vertical-polarization port of a dual-polarization antenna element 139, and to route a horizontal-polarization transmission between the transceiver 138 and a horizontal-polarization port of the dual-polarization antenna element 139.

In some demonstrative aspects, baseband controller 150 may be configured to control the plurality of dual-polarization RHs 130 to communicate the MIMO transmission including the first spatial stream 133 communicated with horizontal-polarization via the first dual-polarization RH 132, and the second spatial stream 135 communicated with vertical-polarization via the second dual-polarization RH 134, e.g., as described below.

In some demonstrative aspects, controller 154 may be configured to control trigger and/or instruct the first dual-polarization RH 132 of the plurality of dual-polarization RHs 130 to communicate the first spatial stream 133 of the MIMO transmission with a horizontal-polarization via one or more first dual-polarization antenna elements 127 of the plurality of antenna elements 137 of the first dual-polarization RH 132, e.g., via one antenna element, some antenna elements, or all antenna elements, of the plurality of antenna elements 137, e.g., as described below.

In some demonstrative aspects, controller 154 may be configured to control trigger and/or instruct the second dual-polarization RH 134 of the plurality of dual-polarization RHs 130 to communicate the second spatial stream 135 of the MIMO transmission with a vertical-polarization via one or more second dual-polarization antenna elements 129 of the plurality of antenna elements 139 of the second dual-polarization RH 134, e.g., via one antenna element, some antenna elements, or all antenna elements, of antenna elements 139, e.g., as described below.

In some demonstrative aspects, controller 154 may be configured to provide one or more control indications to the plurality of dual-polarization RHs 130, for example, to control the plurality of dual-polarization RHs 130 to communicate the MIMO transmission with the horizontal-polarization and the vertical-polarization, e.g., as described below.

In some demonstrative aspects, controller 154 may be configured to provide a first control indication 122 to the first dual-polarization RH 132, and to provide a second control indication 124 to the second dual-polarization RH 134, e.g., as described below.

In some demonstrative aspects, the first control indication 122 may indicate that the first dual-polarization RH 132 is to communicate the first spatial stream 133 with the horizontal-polarization via the one or more dual-polarization antenna elements 127 of the first dual-polarization RH 132, e.g., as described below.

In some demonstrative aspects, the second control indication 124 may indicate that the second dual-polarization RH 134 is to communicate the second spatial stream 135 with the vertical-polarization via the one or more dual-polarization antenna elements 129 of the second dual-polarization RH 134, e.g., as described below.

In some demonstrative aspects, controller 154 may be configured to control trigger and/or instruct the first dual-polarization RH 132, e.g., using control indication 122, to transmit the first spatial stream 133 with horizontal-polarization via the one or more dual-polarization antenna elements 127 of the first dual-polarization RH 132; and/or to control the second dual-polarization RH 134, e.g., using control indication 124, to transmit the second spatial stream 135 with vertical-polarization via the one or more dual-polarization antenna elements 129 of the second dual-polarization RH 134, e.g., as described below.

In some demonstrative aspects, controller 154 may be configured to control trigger and/or instruct the first dual-polarization RH 132, e.g., using control indication 122, to receive the first spatial stream 133 with horizontal-polarization via the one or more dual-polarization antenna elements 127 of the first dual-polarization RH 132; and/or to control the second dual-polarization RH 134, e.g., using control indication 124, to receive the second spatial stream 135 with vertical-polarization via the one or more dual-polarization antenna elements 129 of the second dual-polarization RH 134, e.g., as described below.

In some demonstrative aspects, baseband controller 150 may be configured to control the plurality of dual-polarization RHs 130, e.g., using control indications 122 and/or 124, to communicate an other MIMO transmission, for example, with device 160 and/or another device, e.g., as described below.

In some demonstrative aspects, controller 154 may be configured to control trigger and/or instruct the first dual-polarization RH 132, e.g., using control indication 122, to communicate a first spatial stream of an other MIMO transmission with vertical-polarization via the one or more dual-polarization antenna elements 127 of the first dual-polarization RH 132, and/or to control the second dual-polarization RH 134, e.g., using control indication 124, to communicate a second spatial stream of the other MIMO transmission with horizontal-polarization via the one or more second dual-polarization antenna elements 129 of the second dual-polarization RH 134, e.g., as described below.

In some demonstrative aspects, baseband controller 150 may be configured to select which RH of the plurality of RHs may communicate with horizontal-polarization, and which RH of the plurality of RHs may communicate with vertical-polarization, e.g., as described below.

In some demonstrative aspects, controller 154 may be configured to select, for example, based on at least one predefined polarization criterion, which of the plurality of RHs 130 is to be controlled as the first dual-polarization RH 132 to communicate with horizontal-polarization, and/or which of the plurality of RHs 130 may be controlled as the second dual-polarization RH 134 to communicate with vertical-polarization, e.g., as described below.

In some demonstrative aspects, controller 154 may be configured to control trigger and/or instruct device 102 to communicate a SISO transmission, e.g., as described below.

In some demonstrative aspects, controller 154 may be configured to determine a selected dual-polarization RH of the plurality of dual-polarization RHs 130 to communicate a SISO transmission, e.g., as described below.

In some demonstrative aspects, controller 154 may be configured to control the selected dual-polarization RH to communicate the SISO transmission with a selected polarization of the horizontal-polarization and the vertical-polarization, e.g., as described below.

In some demonstrative aspects, controller 154 may be configured to determine the selected dual-polarization RH from the plurality of dual-polarization RHs 130, for example, based on at least one SNR criterion, e.g., as described below.

In some demonstrative aspects, controller 154 may be configured to determine the selected dual-polarization RH from the plurality of dual-polarization RHs 130, for example, based on an SNR criterion corresponding to communication via the plurality of dual-polarization RHs 130, e.g., as described below.

In one example, controller 154 may select from the plurality of dual-polarization RHs 130 the dual-polarization RH having a best SNR.

In other aspects, controller 154 may be configured to determine the selected dual-polarization RH from the plurality of dual-polarization RHs 130 based on any other additional or alternative criteria.

In some demonstrative aspects, controller 154 may be configured to determine the selected polarization mode, for example, based on at least one SNR criterion, e.g., as described below.

In some demonstrative aspects, controller 154 may be configured to determine the selected polarization mode, for example, based on an SNR criterion corresponding to communications with the vertical-polarization mode and the horizontal-polarization mode, e.g., as described below.

In one example, controller 154 may select the vertical-polarization mode, for example, when the vertical-polarization mode has a better SNR compared to an SNR of the horizontal-polarization mode, or vice versa.

In other aspects, controller 154 may be configured to determine the selected polarization mode based on any other additional or alternative criteria.

In some demonstrative aspects, baseband controller 150 may be configured to control trigger and/or instruct device 102 to process received communications according to a polarization diversity reception mode, for example, an Rx MRC mode, e.g., as described below.

In some demonstrative aspects, controller 154 may be configured to control trigger and/or instruct a dual-polarization RH of the plurality of dual-polarization RHs 130 to process a received transmission according to a polarization diversity reception mode, e.g., as described below.

In some demonstrative aspects, controller 154 may be configured to control trigger and/or instruct dual-polarization RH 132 to process the received transmission according to the polarization diversity reception mode, for example, by combining vertical-polarization signals from one or more dual-polarization antenna elements 127 of the dual-polarization RH 132, and horizontal-polarization signals from the one or more dual-polarization antenna elements 127 of the dual-polarization RH 132, e.g., as described below.

In some demonstrative aspects, a dual-polarization RH of the plurality of dual-polarization RHs, e.g., dual-polarization RH 132 and/or dual-polarization RH 134, may support one or more an antenna array configurations, e.g., as described below.

In some demonstrative aspects, antenna array 127 may include a phased array antenna including the plurality of dual-polarization antenna elements 137, e.g., as described below.

In some demonstrative aspects, antenna array 129 may include a phased array antenna including the plurality of dual-polarization antenna elements 139, e.g., as described below.

In some demonstrative aspects, a dual-polarization RH, e.g., dual-polarization RH 132 and/or dual-polarization RH 134, may include a beamformer configured to form a beam to communicate via the phased array antenna of the dual-polarization RH, e.g., as described below.

In some demonstrative aspects, the dual-polarization RH, e.g., dual-polarization RH 132 and/or dual-polarization RH 34, may include first and second beamformers, e.g., as described below.

In one example, the dual-polarization RH may include the first and second beamformers, for example, to support the polarization diversity reception mode.

In some demonstrative aspects, the first and second beamformers may include a first analog beamformer to form a first beam to receive vertical-polarization signals from the phased array antenna of the dual-polarization RH, e.g., as described below.

In some demonstrative aspects, the first and second beamformers may include a second analog beamformer to form a second beam to receive horizontal-polarization signals from the phased array antenna of the dual-polarization RH, e.g., as described below.

In some demonstrative aspects, antenna array 127 may include a non-phased array antenna including the plurality of dual-polarization antenna elements 137.

In some demonstrative aspects, antenna array 129 may include a non-phased array antenna including the plurality of dual-polarization antenna elements 139.

In some demonstrative aspects, dual-polarization switches 144 and/or 148 may support one or more dual-polarization switching configurations, e.g., as described below.

In some demonstrative aspects, dual-polarization switch 146 may be configured, for example, according to a first dual-polarization switching configuration including a Transmit (Tx) amplifier, a receive (Rx) amplifier, a transceiver-amplifier switch, and/or an amplifier-antenna switch, e.g., as described below.

In some demonstrative aspects, the Tx amplifier may include a Power Amplifier (PA), and/or the Rx amplifier may include a Low Noise Amplifier (LNA), e.g., as described below.

In other aspects, the Tx amplifier may include any other amplifier, and/or the Rx amplifier may include any other amplifier.

In some demonstrative aspects, the Tx amplifier may be configured to amplify a Tx signal to be transmitted via the dual-polarization antenna element 131, e.g., as described below.

In some demonstrative aspects, the Rx amplifier may be configured to amplify an Rx signal from the dual-polarization antenna element 131, e.g., as described below.

In some demonstrative aspects, the transceiver-amplifier switch may be configured to switch between a plurality of transceiver-amplifier connections, e.g., as described below.

In some demonstrative aspects, the plurality of transceiver-amplifier connections may include a first transceiver-amplifier connection between the transceiver 136 and the Tx amplifier, and/or a second transceiver-amplifier connection between the transceiver 136 and the Rx amplifier, e.g., as described below.

In some demonstrative aspects, the amplifier-antenna switch may be configured to switch between a plurality of amplifier antenna connections, e.g., as described below.

In some demonstrative aspects, the plurality of amplifier antenna connections may include a first connection between the Tx amplifier and the horizontal-polarization port 142 of the dual-polarization antenna element 131, a second connection between the Tx amplifier and the vertical-polarization port 141 of the dual-polarization antenna element 131, a third connection between the Rx amplifier and the horizontal-polarization port 142 of the dual-polarization antenna element 131, and/or a fourth connection between the Rx amplifier and the vertical-polarization port 141 of the dual-polarization antenna element 131, e.g., as described below.

In some demonstrative aspects, dual-polarization switch 146 may be configured, for example, according to a second dual-polarization switching configuration including a Tx amplifier, a first Rx amplifier, a second Rx amplifier, a transceiver-amplifier switch, and/or an amplifier-antenna switch, e.g., as described below.

In some demonstrative aspects, the Tx amplifier may include a PA, the first Rx amplifier may include a first LNA, and/or the second Rx amplifier may include a second LNA, e.g., as described below.

In other aspects, the Tx amplifier may include any other amplifier, the first Rx amplifier may include any other amplifier, and/or the second Rx amplifier may include any other amplifier.

In some demonstrative aspects, the Tx amplifier may be configured to amplify a Tx signal to be transmitted via the dual-polarization antenna element 131.

In some demonstrative aspects, the first Rx amplifier may be configured to amplify a horizontal-polarization Rx signal from the horizontal-polarization port 142 of the dual-polarization antenna element 131, e.g., as described below.

In some demonstrative aspects, the second Rx amplifier may be configured to amplify a vertical-polarization Rx signal from the vertical-polarization port 141 of the dual-polarization antenna element 131, e.g., as described below.

In some demonstrative aspects, the transceiver-amplifier switch may be configured to switch between a plurality of transceiver-amplifier connections, e.g., as described below.

In some demonstrative aspects, the plurality of transceiver-amplifier connections may include a first transceiver-amplifier connection between the transceiver 136 and the Tx amplifier, a second transceiver-amplifier connection between the transceiver 136 and the first Rx amplifier, and/or a third transceiver-amplifier connection between the transceiver 136 and the second Rx amplifier, e.g., as described below.

In some demonstrative aspects, the amplifier-antenna switch may be configured to switch between a plurality of amplifier antenna connections, e.g., as described below.

In some demonstrative aspects, the plurality of amplifier antenna connections may include a first connection between the Tx amplifier and the horizontal-polarization port 142 of the dual-polarization antenna element 131, a second connection between the Tx amplifier and the vertical-polarization port 141 of the dual-polarization antenna element 131, a third connection between the first Rx amplifier and the horizontal-polarization port 142 of the dual-polarization antenna element 131, and/or a fourth connection between the second Rx amplifier and the vertical-polarization port 141 of the dual-polarization antenna element 131, e.g., as described below.

In some demonstrative aspects, dual-polarization switch 146 may be configured, for example, according to a third dual-polarization switching configuration including a Tx amplifier, a first Rx amplifier, a second Rx amplifier, a transceiver-amplifier switch, and/or an amplifier-antenna switch, e.g., as described below.

In one example, the third configuration may be implemented, for example, to support the polarization diversity reception mode, for example, the Rx MRC mode.

In some demonstrative aspects, the Tx amplifier may include a PA, the first Rx amplifier may include a first LNA, and/or the second Rx amplifier may include a second LNA, e.g., as described below.

In other aspects, the Tx amplifier may include any other amplifier, the first Rx amplifier may include any other amplifier, and/or the second Rx amplifier may include any other amplifier.

In some demonstrative aspects, the Tx amplifier may be configured to amplify a Tx signal to be transmitted via the dual-polarization antenna element 131, e.g., as described below.

In some demonstrative aspects, the first Rx amplifier may be configured to amplify a horizontal-polarization Rx signal from the horizontal-polarization port 142 of the dual-polarization antenna element 131, e.g., as described below.

In some demonstrative aspects, the second Rx amplifier may be configured to amplify a vertical-polarization Rx signal from the vertical-polarization port 141 of the dual-polarization antenna element 131, e.g., as described below.

In some demonstrative aspects, the transceiver amplifier switch may be configured to switch between a plurality of transceiver-amplifier connections, e.g., as described below.

In some demonstrative aspects, the plurality of transceiver-amplifier connections may include a first transceiver amplifier connection between the transceiver 136 and the Tx amplifier, and/or a second transceiver amplifier connection between the transceiver 136 and at least one of the first Rx amplifier and/or the second Rx amplifier, e.g., as described below.

In some demonstrative aspects, the amplifier-antenna switch may be configured to switch between a plurality of amplifier antenna connections, e.g., as described below.

In some demonstrative aspects, the plurality of amplifier antenna connections may include a first connection between the Tx amplifier and the horizontal-polarization port 142 of the dual-polarization antenna element 131, a second connection between the Tx amplifier and the vertical-polarization port 141 of the dual-polarization antenna element 131, and/or a third connection between the first Rx amplifier and the horizontal-polarization port 142 of the dual-polarization antenna element 131, and between the second Rx amplifier and the vertical-polarization port 141 of the dual-polarization antenna element 131, e.g., as described below.

In other aspects, dual-polarization switch 146 may be implemented according to any other additional or alternative configuration utilizing one or more additional or alternative amplifiers and/or switches.

Figure 2:
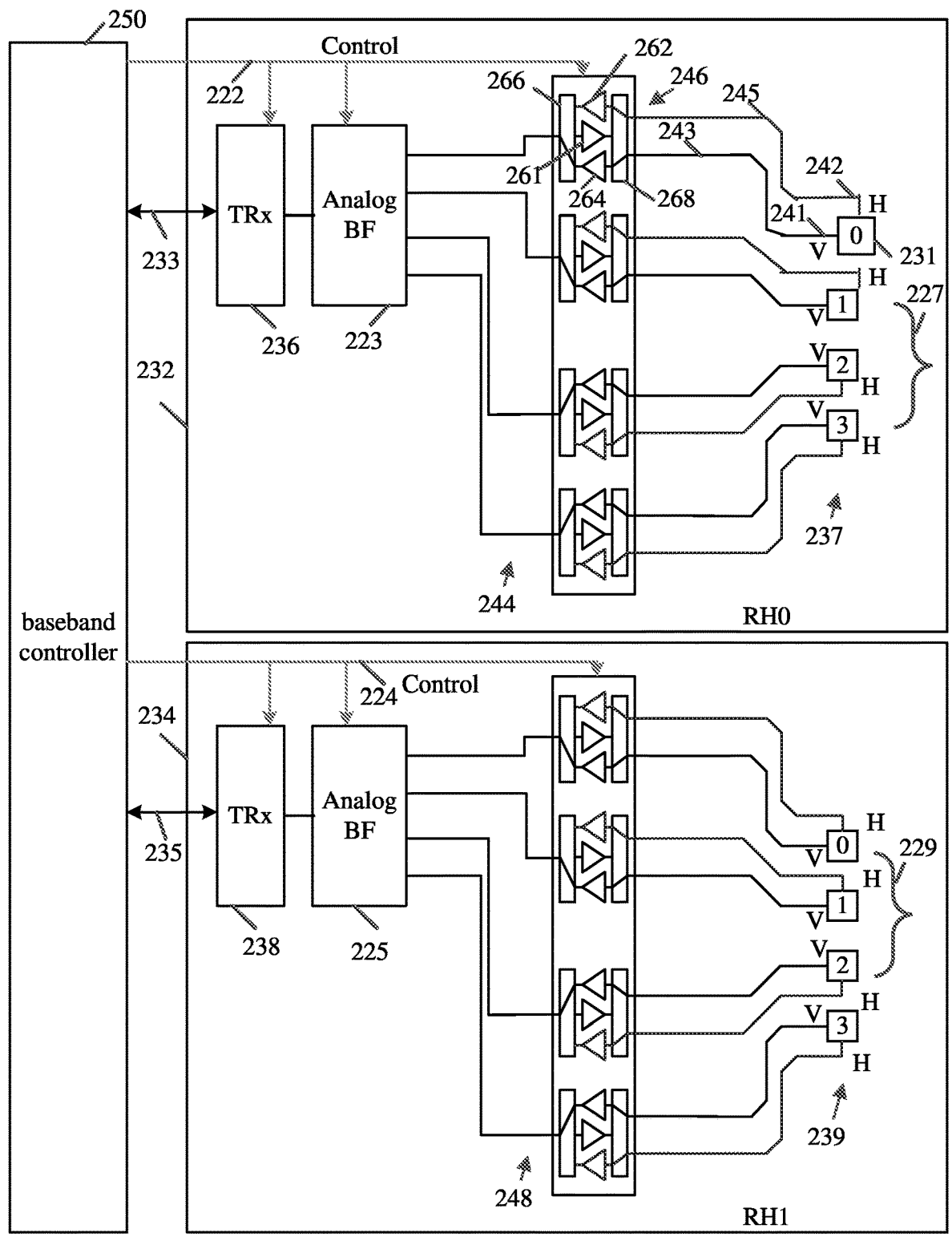
FIG. 2 is a schematic block diagram illustration of a dual-polarization Multiple-Input-Multiple-Output (MIMO) system, in accordance with some demonstrative aspects.

Reference is made to FIG. 2, which schematically illustrates a dual-polarization MIMO system 200, in accordance with some demonstrative aspects. For example, device 102 (FIG. 1) may include one or more elements and/or components of dual-polarization MIMO system 200.

In some demonstrative aspects, as shown in FIG. 2, dual-polarization MIMO system 200 may include a baseband controller 250 configured to control a first dual-polarization RH 232 and a second dual-polarization RH 234 to communicate a MIMO transmission. For example, baseband controller 150 (FIG. 1) may include one or more elements of baseband controller 250, and/or may perform one or more operations of, and/or one or more functionalities of, baseband controller 250; first dual-polarization RH 132 (FIG. 1) may include one or more elements of first dual-polarization RH 232, and/or may perform one or more operations of, and/or one or more functionalities of, first dual-polarization RH 232; and/or second dual-polarization RH 134 (FIG. 1) may include one or more elements of second dual-polarization RH 234, and/or may perform one or more operations of, and/or one or more functionalities of, second dual-polarization RH 234.

In some demonstrative aspects, as shown in FIG. 2, first dual-polarization RH 232 may include a first transceiver 236 configured to communicate a first spatial stream 233 of the MIMO transmission.

In some demonstrative aspects, as shown in FIG. 2, second dual-polarization RH 234 may include a second transceiver 238 configured to communicate a second spatial stream 235 of the MIMO transmission.

In some demonstrative aspects, as shown in FIG. 2, first dual-polarization RH 232 may include a first phased array antenna including a plurality of dual-polarization antenna elements 237, e.g., as described below.

In some demonstrative aspects, as shown in FIG. 2, second dual-polarization RH 234 may include a second phased array antenna including a plurality of dual-polarization antenna elements 239, e.g., as described below.

In one example, the phased array antennas of dual-polarization RH 232 and/or RH 234 may be implemented by a 1×4 array, e.g., with an antenna gain of 10 dBi, or any other antenna array with any other gain.

In another example, the phased array antennas of dual-polarization RH 232 and/or RH 234 may be extended to a larger antenna array with a different, e.g., higher, antenna gain.

In some demonstrative aspects, as shown in FIG. 2, first dual-polarization RH 232 may include a first beamformer 223 configured to form a first beam to communicate via the antenna elements 237 of first dual-polarization RH 232.

In some demonstrative aspects, as shown in FIG. 2, second dual-polarization RH 234 may include a second beamformer 225 configured to form a second beam to communicate via antenna elements 239 of second dual-polarization RH 234.

In some demonstrative aspects, as shown in FIG. 2, a dual-polarization antenna element 231 of the plurality of dual-polarization antenna elements 237 and/or 239 may include a vertical-polarization port (V) 241 and a horizontal-polarization port (H) 242.

In some demonstrative aspects, as shown in FIG. 2, first dual-polarization RH 232 may include a first plurality of dual-polarization switches 244.

In some demonstrative aspects, as shown in FIG. 2, second dual-polarization RH 234 may include a second plurality of dual-polarization switches 248.

In some demonstrative aspects, as shown in FIG. 2, a dual-polarization switch 246 of the plurality of dual-polarization switches 244 and/or 248, may be configured to route a vertical-polarization transmission 243 between the transceiver 236 and the vertical-polarization port 241 of the dual-polarization antenna element 231, and/or to route a horizontal-polarization transmission 245 between the transceiver 236 and the horizontal-polarization port 242 of the dual-polarization antenna element 231.

In some demonstrative aspects, baseband controller 250 may be configured to control trigger and/or instruct the first dual-polarization RH 232 to communicate the first spatial stream 233 of the MIMO transmission with a horizontal-polarization via one or more first dual-polarization antenna elements 227 of the plurality of antenna elements 237 of the first dual-polarization RH 232, e.g., via one antenna element, some antenna elements, or all antenna elements, of the plurality of antenna elements 237.

In some demonstrative aspects, baseband controller 250 may be configured to control trigger and/or instruct the second dual-polarization RH 234 to communicate the second spatial stream 235 of the MIMO transmission with a vertical-polarization via one or more second dual-polarization antenna elements 229 of the plurality of antenna elements 239 of the second dual-polarization RH 234, e.g., via one antenna element, some antenna elements, or all antenna elements, of the plurality of antenna elements 239.

In some demonstrative aspects, as shown in FIG. 2, baseband controller 250 may be configured to provide a first control indication 222 to the first dual-polarization RH 232, and/or to provide a second control indication 224 to the second dual-polarization RH 234.

In some demonstrative aspects, the first control indication 222 may indicate that the first dual-polarization RH 232 is to communicate the first spatial stream 233 with a first polarization, e.g., the horizontal-polarization, via the one or more dual-polarization antenna elements 227.

In some demonstrative aspects, the second control indication 224 may indicate that the second dual-polarization RH 234 is to communicate the second spatial stream 235 with a second polarization, e.g., the vertical-polarization, via the one or more dual-polarization antenna elements 229.

In some demonstrative aspects, baseband controller 250 may be configured to control, trigger and/or process a SISO transmission via a selected RH of dual-polarization RH 232 and dual-polarization RH 234, e.g., as described below.

In some demonstrative aspects, baseband controller 250 may be configured to determine a selected dual-polarization RH, e.g., dual-polarization RH 232, to communicate the SISO transmission.

In some demonstrative aspects, as shown in FIG. 2, dual-polarization switch 246 may include a Tx amplifier 261, a first Rx amplifier 262, a second Rx amplifier 264, a transceiver-amplifier switch 266, and an amplifier-antenna switch 268, e.g., as described below.

In other aspects, dual-polarization switch 246 may include any other additional and/or alternative elements and/or components, and/or may have any other configuration.

In some demonstrative aspects, the Tx amplifier 261 may include a PA, the first Rx amplifier 262 may include a first LNA, and/or the second Rx amplifier 264 may include a second LNA.

In other aspects, the Tx amplifier 261 may include any other amplifier, the first Rx amplifier 262 may include any other amplifier, and/or the second Rx amplifier 264 may include any other amplifier.

In some demonstrative aspects, the Tx amplifier 261 may be configured to amplify a Tx signal to be transmitted via the dual-polarization antenna element 231.

In some demonstrative aspects, the first Rx amplifier 262 may be configured to amplify a horizontal-polarization Rx signal, e.g., of horizontal-polarization transmission 245, from the horizontal-polarization port 242 of the dual-polarization antenna element 231.

In some demonstrative aspects, as shown in FIG. 2, the second Rx amplifier 264 may be configured to amplify a vertical-polarization Rx signal, e.g., of vertical-polarization transmission 243, from the vertical-polarization port 241 of the dual-polarization antenna element 231.

In some demonstrative aspects, as shown in FIG. 2, the transceiver-amplifier switch 266 may be configured to switch between a plurality of transceiver-amplifier connections, e.g., as described below. For example, baseband controller 250—may control transceiver-amplifier switch 266, e.g., using control indication 222.

In some demonstrative aspects, the plurality of transceiver-amplifier connections may include a first transceiver-amplifier connection between the transceiver 236 and the Tx amplifier 261, a second transceiver-amplifier connection between the transceiver 236 and the first Rx amplifier 262, and/or a third transceiver-amplifier connection between the transceiver 236 and the second Rx amplifier 264.

In some demonstrative aspects, as shown in FIG. 2, the amplifier-antenna switch 268 may be configured to switch between a plurality of amplifier antenna connections, e.g., as described below. For example, baseband controller 250 may control amplifier-antenna switch 268, e.g., using control indication 222.

In some demonstrative aspects, the plurality of amplifier antenna connections may include a first connection between the Tx amplifier 261 and the horizontal-polarization port 242 of the dual-polarization antenna element 231, a second connection between the Tx amplifier 261 and the vertical-polarization port 241 of the dual-polarization antenna element 231, a third connection between the first Rx amplifier 262 and the horizontal-polarization port 242 of the dual-polarization antenna element 231, and/or a fourth connection between the second Rx amplifier 264 and the vertical-polarization port 241 of the dual-polarization antenna element 231.

In one example, baseband controller 250 may be configured to control transceiver 236, e.g., via control indication 222, to operate at a transmitter mode following a same polarization selected for a receiver mode, for example, by switching the Tx amplifier 261 to a same polarization as the receiver mode, for example, according to a Time Domain Duplexing (TDD) scheme between Rx and Tx.

In some demonstrative aspects, as shown in FIG. 2, activation and control of transceivers 236 and/or 238, beamformers 223 and/or 225, and switches 224 and/or 248, e.g., including selection between the Rx amplifiers 262 and/or 264, and/or routing signals from the Tx amplifier 261 to the corresponding antenna diversity excitation, may be performed by the baseband controller 250, e.g., via control indications 222 and/or 224.

In some demonstrative aspects, an RH of dual-polarization RHs 232 and/or 234 may be utilized to support a single spatial stream, e.g., either over horizontal-polarization or over vertical-polarization. Accordingly, an RH, e.g., each RH, of dual-polarization RHs 232 and/or 234 may be implemented with reduced size, reduced cost, and/or reduced interface bandwidth to baseband controller 250.

In some demonstrative aspects, baseband controller 250 may control MIMO operation of dual-polarization MIMO system 200, for example, through activation of both dual-polarization RHs 232 and 234, where one RH, e.g., RH 232, uses the vertical-polarization, and another RH, e.g., RH 234, uses the horizontal-polarization.

In some demonstrative aspects, baseband controller 250 may select a polarization to be utilized by dual-polarization RHs 232 and 234, for example, such that an SNR of a relevant spatial stream may be maximized. Such scheme may yield an improved MIMO performance, for example, in low cross-polarization channels, e.g., line-of-sight or near line-of-sight channels.

In other aspects, baseband controller 250 may select a polarization to be utilized by dual-polarization RHs 232 and 234 based on any other additional or alternative criteria.

In some demonstrative aspects, dual-polarization MIMO system 200 may utilize activation of both RH 232 and RH 234 to perform MIMO communication with dual-polarization, e.g., as described above. This implementation may provide a technical benefit in terms of an ability to implement RHs having reduced size and/or cost.

In one example, many mmWave phased array systems may be implemented using two or more antenna modules in a host device/platform, for example, to improve the spatial coverage. Accordingly, implementation of dual-polarization MIMO system 200 may support utilizing antenna modules with reduced size and/or reduced cost.

In some demonstrative aspects, dual-polarization MIMO system 200 may be operable to receive a horizontal-polarization signal and a vertical-polarization signal through relevant and separate antenna feeds. According to this example, cross-polarization may occur over an air channel, for example, depending on a number and/or nature of reflections. For example, a signal that was transmitted with a horizontal-polarization may be received with either horizontal-polarization or vertical-polarization. In such case, a gain loss resulting from the polarization selection may be very small, e.g., up to 0.5 dB. However, when a signal received with strong cross polarization, a gain loss of up to 3 dB may occur, for example, when selecting the best polarization.

In some demonstrative aspects, dual-polarization RHs 232 and/or 234 may be co-located within a host device/platform, e.g., within device 102 (FIG. 1), while antenna module co-location may not be a prerequisite, and may be subject to implementation considerations.

In one example, the dual-polarization RHs 232 and 234 may be in different locations within the host device/platform, for example, in order to improve a coverage, e.g., in a SISO transmission. For example, such a configuration may be based on an assumption of high probability for good link conditions, e.g., low path loss on vertical-polarization and/or horizontal-polarization in dual-polarization RHs 232 and/or 234, which may support improved MIMO performance.

Some demonstrative may be implemented with respect to a dual-polarization MIMO system, e.g., dual-polarization MIMO system 200, utilizing RHs including phased array antennas, e.g., as described above. However, in other aspects, any other dual-polarization MIMO systems may be implemented, for example, utilizing non-phased array antenna technologies, e.g., a lensing antenna, or the like.

Figure 3:
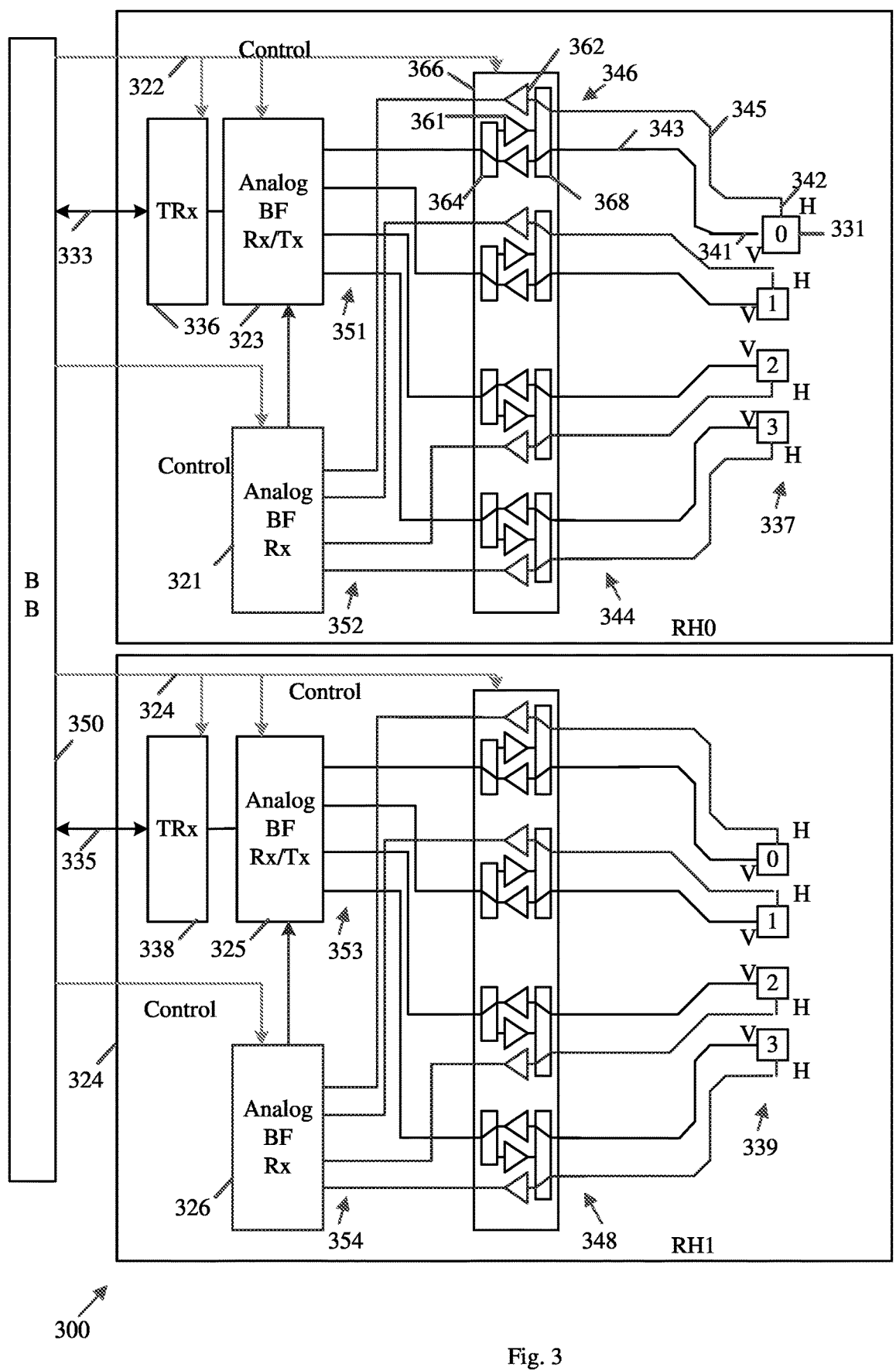
FIG. 3 is a schematic block diagram illustration of a dual-polarization MIMO system configured to support a polarization-diversity reception mode, in accordance with some demonstrative aspects.

Reference is made to FIG. 3, which schematically illustrates a dual-polarization MIMO system 300 configured to support a polarization-diversity reception mode, in accordance with some demonstrative aspects. For example, device 102 (FIG. 1) may include one or more elements and/or components of dual-polarization MIMO system 300.

In some demonstrative aspects, as shown in FIG. 3, dual-polarization MIMO system 300 may include a baseband controller 350 configured to control a first dual-polarization RH 332 and/or a second dual-polarization RH 334 to process a received transmission according to a polarization diversity reception mode, e.g., an Rx MRC mode. For example, baseband controller 150 (FIG. 1) may include one or more elements of baseband controller 350, and/or may perform one or more operations of, and/or one or more functionalities of, baseband controller 350; first dual-polarization RH 132 (FIG. 1) may include one or more elements of first dual-polarization RH 332, and/or may perform one or more operations of, and/or one or more functionalities of, first dual-polarization RH 332; and/or second dual-polarization RH 134 (FIG. 1) may include one or more elements of second dual-polarization RH 334, and/or may perform one or more operations of, and/or one or more functionalities of, second dual-polarization RH 334.

In some demonstrative aspects, as shown in FIG. 3, first dual-polarization RH 332 may include a first transceiver 336 configured to process a first spatial stream 333 of the received transmission according to the polarization diversity reception mode.

In some demonstrative aspects, as shown in FIG. 3, second dual-polarization RH 334 may include a second transceiver 338 configured to process a second spatial stream 335 of the received transmission according to the polarization diversity reception mode.

In some demonstrative aspects, as shown in FIG. 3, first dual-polarization RH 332 may include a first phased array antenna including a plurality of dual-polarization antenna elements 337, e.g., as described below.

In some demonstrative aspects, as shown in FIG. 3, second dual-polarization RH 334 may include a second phased array antenna including a plurality of dual-polarization antenna elements 339, e.g., as described below.

In one example, the phased array antennas of dual-polarization RH 332 and/or RH 334 may be implemented by a 1×4 array, e.g., with an antenna gain of 10 dBi, or any other antenna array with any other gain.

In another example, the phased array antennas of dual-polarization RH 332 and/or RH 334 may be extended to a larger antenna array with a different, e.g., higher, antenna gain.

In some demonstrative aspects, as shown in FIG. 3, first dual-polarization RH 332 may include a first analog beamformer 323 and a second analog beamformer 321.

In some demonstrative aspects, first analog beamformer 323 may be configured to form a first beam to receive vertical-polarization signals 351 from the dual-polarization antenna elements 337 of first dual-polarization RH 332.

In some demonstrative aspects, second analog beamformer 321 may be configured to form a second beam to receive horizontal-polarization signals 352 from the dual-polarization antenna elements 337 of first dual-polarization RH 332.

In some demonstrative aspects, as shown in FIG. 3, second dual-polarization RH 334 may include a first analog beamformer 325 and a second analog beamformer 326.

In some demonstrative aspects, first analog beamformer 325 may be configured to form a third beam to receive vertical-polarization signals 353 from the dual-polarization antenna elements 339 of second dual-polarization RH 334, e.g., as described below.

In some demonstrative aspects, second analog beamformer 326 may be configured to form a fourth beam to receive horizontal-polarization signals 354 from the dual-polarization antenna elements 339 of second dual-polarization RH 334, e.g., as described below.

In one example, the first, second, third, and/or fourth beams may be different one from each other, e.g., directed to different directions.

In some demonstrative aspects, baseband controller 350 may be configured to control trigger and/or instruct the first dual-polarization RH 332 to process the received transmission according to the polarization diversity reception mode, for example, by combining vertical-polarization signals 351 from one or more dual-polarization antenna elements 327 of the dual-polarization RH 332, and horizontal-polarization signals 352 from the one or more dual-polarization antenna elements 337 of the dual-polarization RH 332.

In some demonstrative aspects, baseband controller 350 may be configured to control trigger and/or instruct the second dual-polarization RH 334 to process the received transmission according to the polarization diversity reception mode, for example, by combining vertical-polarization signals 353 from one or more dual-polarization antenna elements 339 of the dual-polarization RH 334, and horizontal-polarization signals 354 from the one or more dual-polarization antenna elements 339 of the dual-polarization RH 334.

In some demonstrative aspects, as shown in FIG. 3, baseband controller 350 may be configured to provide a first control indication 322 to the first dual-polarization RH 332, and/or to provide a second control indication 324 to the second dual-polarization RH 334.

In some demonstrative aspects, as shown in FIG. 3, the first control indication 322 may indicate that the first dual-polarization RH 332 is to process the first spatial stream 333 according to the polarization diversity reception mode, and/or the second control indication 324 may indicate that the second dual-polarization RH 334 is to process the second spatial stream 335 according to the polarization diversity reception mode.

In some demonstrative aspects, as shown in FIG. 3, a dual-polarization antenna element 331 of the plurality of dual-polarization antenna elements 337 and/or 339 may include a vertical-polarization port 341 and a horizontal-polarization port 342.

In some demonstrative aspects, as shown in FIG. 3, first dual-polarization RH 332 may include a first plurality of dual-polarization switches 344.

In some demonstrative aspects, as shown in FIG. 3, second dual-polarization RH 334 may include a second plurality of dual-polarization switches 348.

In some demonstrative aspects, as shown in FIG. 3, a dual-polarization switch 346 of the plurality of dual-polarization switches 344 and/or 348 may be configured to route a vertical-polarization received transmission 343 from the vertical-polarization port 341 of the dual-polarization antenna element 331 to the first BF 323, and/or to route a horizontal-polarization received transmission 345 from the horizontal-polarization port 342 of the dual-polarization antenna element 331 to the second BF 321.

In some demonstrative aspects, as shown in FIG. 3, dual-polarization switch 346 may include a Tx amplifier 361, a first Rx amplifier 362, a second Rx amplifier 364, a transceiver-amplifier switch 366, and/or an amplifier-antenna switch 368, e.g., as described below.

In some demonstrative aspects, the Tx amplifier 361 may include a PA, the first Rx amplifier 362 may include a first LNA, and/or the second Rx amplifier 364 may include a second LNA.

In other aspects, the Tx amplifier 361 may include any other amplifier, the first Rx amplifier 362 may include any other amplifier, and/or the second Rx amplifier 364 may include any other amplifier.

In some demonstrative aspects, as shown in FIG. 3, the Tx amplifier 361 may be configured to amplify a Tx signal to be transmitted via the dual-polarization antenna element 331.

In some demonstrative aspects, as shown in FIG. 3, the first Rx amplifier 362 may be configured to amplify a horizontal-polarization Rx signal from the horizontal-polarization port 342 of the dual-polarization antenna element 331.

In some demonstrative aspects, as shown in FIG. 3, the second Rx amplifier 364 may be configured to amplify a vertical-polarization Rx signal from the vertical-polarization port 341 of the dual-polarization antenna element 331.

In some demonstrative aspects, as shown in FIG. 3, the transceiver-amplifier switch 366 may be configured to switch between a plurality of transceiver-amplifier connections, for example, based on control indication 322, e.g., as described below.

In some demonstrative aspects, the plurality of transceiver-amplifier connections may include a first transceiver-amplifier connection between the transceiver 336 and the Tx amplifier 361, and/or a second transceiver-amplifier connection between the transceiver 336 and the second Rx amplifier 364.

In some demonstrative aspects, as shown in FIG. 3, the amplifier-antenna switch 368 may be configured to switch between a plurality of amplifier antenna connections, for example, based on control indication 322, e.g., as described below.

In some demonstrative aspects, the plurality of amplifier antenna connections may include a first connection between the Tx amplifier 361 and the horizontal-polarization port 342 of the dual-polarization antenna element 331, a second connection between the Tx amplifier 361 and the vertical-polarization port 341 of the dual-polarization antenna element 331, and/or a third connection between the first Rx amplifier 362 and the horizontal-polarization port 342 of the dual-polarization antenna element 331, and between the second Rx amplifier 364 and the vertical-polarization port 341 of the dual-polarization antenna element 331.

In some demonstrative aspects, dual-polarization MIMO system 300 may support MRC Rx diversity between two polarizations at a single RH, for example, by routing received signals through two phased arrays with outputs, which may be combined, or may be selected and routed to a single transceiver and a baseband processor. For example, vertical-polarization signals 351 and horizontal-polarization signals 352 may be routed via analog beamformer 323 and analog beamformer 321, respectively, to transceiver 336 and baseband controller 350. For example, baseband controller 350 may be configured to combine signals 351 and 352, or to select between signals 351 and 352.

In other aspects, dual-polarization switch 346 may include any other additional and/or alternative elements and/or components, and/or may have any other configuration.

In some demonstrative aspects, baseband controller 350 may be configured to control transceiver 336, e.g., via control indication 322, to operate at a transmitter mode following a same polarization selected for a receiver mode, for example, based on an MRC algorithm or any other algorithm, which may be aligned between the transmitter mode and the receiver mode, for example, by switching the Tx amplifier 361 to a same polarization as the receiver mode, for example, according to a TDD scheme between Rx and Tx.

In some demonstrative aspects, as shown in FIG. 3, activation and control of transceivers 336 and/or 338, beamformers 323, 325, 321, and/or 326, and switches 324 and/or 348, e.g., including selection between the Rx amplifiers 362 and/or 364 and routing signals from the Tx amplifier 361 to the corresponding antenna diversity excitation may be performed by the baseband controller 350, e.g., via control indications 322 and/or 324.

In some demonstrative aspects, an RH of dual-polarization RHs 332 and/or 334 may be utilized to support a single spatial stream. Accordingly, an RH, e.g., each RH, of dual-polarization RHs 332 and/or 334 may be implemented with reduced size, reduced cost, reduced power consumption, and/or reduced interface bandwidth to baseband controller 350.

Some demonstrative may be implemented with respect to a dual-polarization MIMO system, e.g., dual-polarization MIMO system 300, utilizing RHs including phased array antennas, e.g., as described above. However, in other aspects, any other dual-polarization MIMO systems may be implemented, for example, utilizing non-phased array antenna technologies, e.g., a lensing antenna, and/or MIMO systems supporting activation of a single element at a given time.

Figure 4:
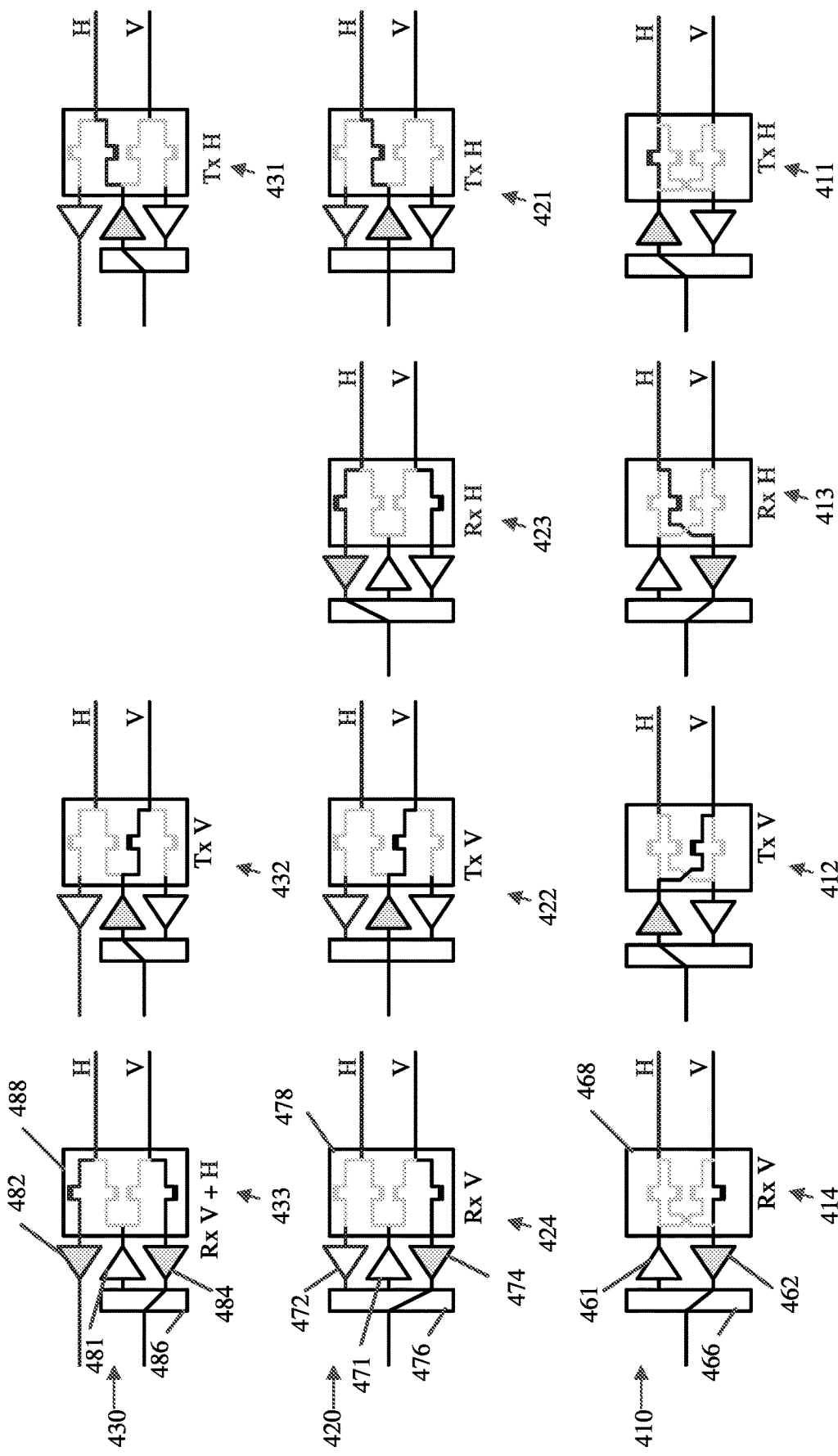
FIG. 4 is a schematic block diagram illustration of implementations of a dual-polarization switch, in accordance with some demonstrative aspects.

Reference is made to FIG. 4, which schematically illustrates implementations of a dual-polarization switch, in accordance with some demonstrative aspects. For example, dual-polarization switch 146 (FIG. 1) may include a dual-polarization switch according to an implementation of FIG. 4.

In one example, a dual-polarization switch may be configured to route a vertical-polarization transmission between a transceiver and a vertical-polarization port of a dual-polarization antenna element, and to route a horizontal-polarization transmission between the transceiver and a horizontal-polarization port of the dual-polarization antenna element. For example, the dual-polarization switch may be configured to route the vertical-polarization transmission between transceiver 136 (FIG. 1) and the vertical-polarization port 141 (FIG. 1) of the dual-polarization antenna element 131 (FIG. 1), and/or to route a horizontal-polarization transmission between the transceiver 136 (FIG. 1) and the horizontal-polarization port 142 (FIG. 1) of the dual-polarization antenna element 131 (FIG. 1).

In some demonstrative aspects, as shown in FIG. 4, a dual-polarization switch 410 may include a Tx amplifier 461, an Rx amplifier 462, a transceiver-amplifier switch 466, and an amplifier-antenna switch 468.

In one example, dual-polarization switch 410 may be implemented, for example, as part of dual-polarization MIMO system 200. For example, dual-polarization switch 246 (FIG. 2) may include one or more elements of dual-polarization switch 410, and/or may perform one or more operations of, and/or one or more functionalities of dual-polarization switch 410.

In some demonstrative aspects, as shown in FIG. 4, dual-polarization switch 410 may support a plurality of connections, for example, including a first connection 411 between the Tx amplifier 461 and the horizontal-polarization port H, a second connection 412 between the Tx amplifier 461 and the vertical-polarization port V, a third connection 413 between the Rx amplifier 462 and the horizontal-polarization port H, and a fourth connection between the Rx amplifier 462 and the vertical-polarization port V.

In some demonstrative aspects, as shown in FIG. 4, a dual-polarization switch 420 may include a Tx amplifier 471, a first Rx amplifier 472, a second Rx amplifier 474, a transceiver-amplifier switch 476, and an amplifier-antenna switch 478, e.g., as described below.

In one example, dual-polarization switch 420 may be implemented, for example, as part of dual-polarization MIMO system 200. For example, dual-polarization switch 246 (FIG. 2) may include one or more elements of dual-polarization switch 420, and/or may perform one or more operations of, and/or one or more functionalities of dual-polarization switch 420.

In some demonstrative aspects, as shown in FIG. 4, dual-polarization switch 420 may support a plurality of connections, for example, including a first connection 421 between the Tx amplifier 471 and the horizontal-polarization port H, a second connection 422 between the Tx amplifier 461 and the vertical-polarization port V, a third connection 423 between the first Rx amplifier 472 and the horizontal-polarization port H, and a fourth connection 424 between the second Rx amplifier 474 and the vertical-polarization port V.

In some demonstrative aspects, as shown in FIG. 4, dual-polarization switch 420 may implement two Rx amplifiers 472 and 474, e.g., per each antenna element, and/or both Rx amplifiers may be connected through a single switch to the horizontal-polarization port or the vertical-polarization port.

In some demonstrative aspects, as shown in FIG. 4, dual-polarization switch 410 may be more compact, e.g., compared to dual-polarization switch 410, for example, since dual-polarization switch 410 may implement a single Rx amplifier per each antenna element. However, the single Rx amplifier may be selected through two switches between the horizontal-polarization port and the vertical-polarization port, which may increase a gain loss.

In some demonstrative aspects, as shown in FIG. 4, a dual-polarization switch 430 may include a Tx amplifier 481, a first Rx amplifier 482, a second Rx amplifier 484, a transceiver-amplifier switch 486, and an amplifier-antenna switch 488, e.g., as described below.

In one example, dual-polarization switch 430 may be implemented, for example, as part of a dual-polarization MIMO system 300 (FIG. 3). For example, dual-polarization switch 346 (FIG. 3) may include one or more elements of dual-polarization switch 430, and/or may perform one or more operations of, and/or one or more functionalities of dual-polarization switch 430.

In some demonstrative aspects, as shown in FIG. 4, dual-polarization switch 430 may support a plurality of connections, for example, including a first connection 431 between the Tx amplifier 481 and the horizontal-polarization port H, a second connection 432 between the Tx amplifier 481 and the vertical-polarization port V, and a third connection 433 between the first Rx amplifier 482 and the horizontal-polarization port H and between the second Rx amplifier 484 and the vertical-polarization port V.

In other aspects, one or more dual-polarization switches may be implemented with any other additional and/or alternative elements and/or components, and/or may have any other configuration.

Figure 5:
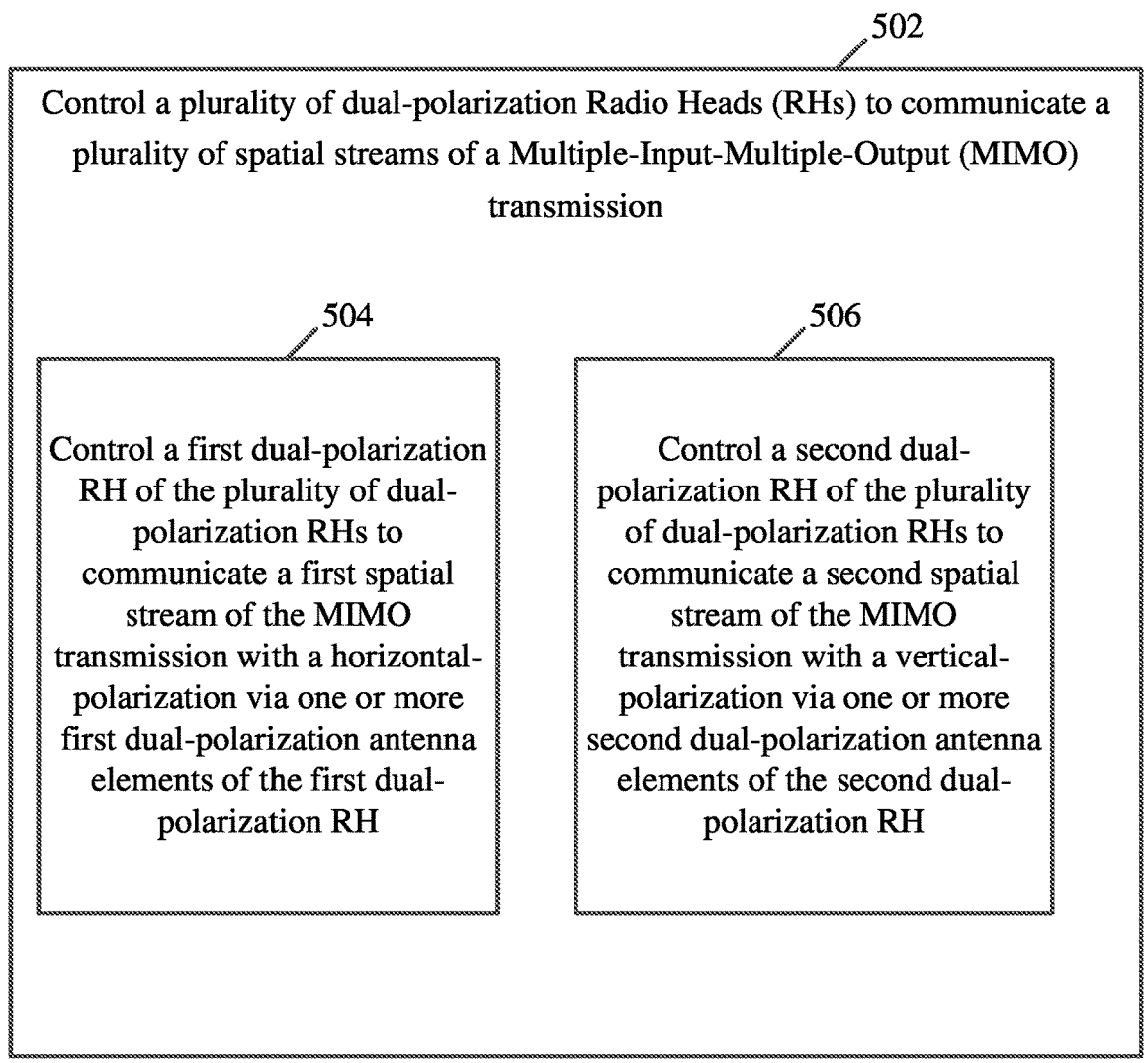
FIG. 5 is a schematic flow-chart illustration of a method communicating a MIMO transmission with polarization, in accordance with some demonstrative aspects.

Reference is made to FIG. 5, which schematically illustrates a method of communicating a MIMO transmission with polarization, in accordance with some demonstrative aspects. For example, one or more operations of the method of FIG. 5 may be performed by one or more elements of a system, e.g., system 100 (FIG. 1), for example, one or more wireless devices, e.g., device 102 (FIG. 1), a baseband controller, e.g., baseband controller 150 (FIG. 1), a dual-polarization RH, e.g., dual-polarization RHs 132 and/or 134 (FIG. 1), a controller, e.g., controller 154 (FIG. 1), an interface, e.g., interface 152 (FIG. 1), and/or a message processor, e.g., message processor 158 (FIG. 1).

As indicated at block 502, the method may include controlling a plurality of dual-polarization RHs to communicate a plurality of spatial streams of a MIMO transmission. For example, controller 154 (FIG. 1) may control the plurality of dual-polarization RHs 130 (FIG. 1) to communicate the plurality of spatial streams of the MIMO transmission, e.g., as described above.

As indicated at block 504, controlling the plurality of dual-polarization RHs may include controlling a first dual-polarization RH of the plurality of dual-polarization RHs to communicate a first spatial stream of the MIMO transmission with a horizontal-polarization via one or more first dual-polarization antenna elements of the first dual-polarization RH. For example, controller 154 (FIG. 1) may control dual-polarization RH 132 (FIG. 1) to communicate the first spatial stream 133 (FIG. 1) of the MIMO transmission with the horizontal-polarization via the one or more first dual-polarization antenna elements 127 (FIG. 1) of the first dual-polarization RH 132 (FIG. 1), e.g., as described above.

As indicated at block 506, controlling the plurality of dual-polarization RHs may include controlling a second dual-polarization RH of the plurality of dual-polarization RHs to communicate a second spatial stream of the MIMO transmission with a vertical-polarization via one or more second dual-polarization antenna elements of the second dual-polarization RH. For example, controller 154 (FIG. 1) may control dual-polarization RH 134 (FIG. 1) to communicate the second spatial stream 135 (FIG. 1) of the MIMO transmission with the vertical-polarization via the one or more second dual-polarization antenna elements 129 (FIG. 1) of the second dual-polarization RH 134 (FIG. 1), e.g., as described above.

Figure 6:
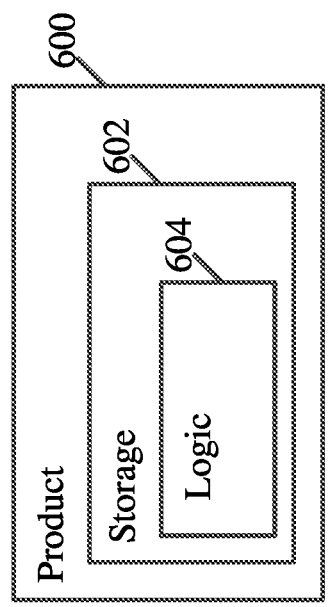
FIG. 6 is a schematic illustration of a product of manufacture, in accordance with some demonstrative aspects.

Reference is made to FIG. 6, which schematically illustrates a product of manufacture 600, in accordance with some demonstrative aspects. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at device 102 (FIG. 1), baseband controller 150 (FIG. 1), interface 152 (FIG. 1), controller 154 (FIG. 1), and/or message processor 158 (FIG. 1), to cause device 102 (FIG. 1), baseband controller 150 (FIG. 1), interface 152 (FIG. 1), controller 154 (FIG. 1), and/or message processor 158 (FIG. 1), to perform, trigger and/or implement one or more operations and/or functionalities, and/or to perform, trigger and/or implement one or more operations and/or functionalities described with reference to the FIGS. 1, 2, 3, 4 and/or 5, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 600 and/or machine-readable storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising a plurality of dual-polarization Radio Heads (RHs), a dual-polarization RH of the plurality of RHs comprising a transceiver; a plurality of dual-polarization antenna elements, a dual-polarization antenna element of the plurality of dual-polarization antenna elements comprising a vertical-polarization port and a horizontal-polarization port; and a plurality of dual-polarization switches, wherein a dual-polarization switch of the plurality of dual-polarization switches is to route a vertical-polarization transmission between the transceiver and the vertical-polarization port of the dual-polarization antenna element, and to route a horizontal-polarization transmission between the transceiver and the horizontal-polarization port of the dual-polarization antenna element; and a baseband controller configured to control the plurality of dual-polarization RHs to communicate a Multiple-Input-Multiple-Output (MIMO) transmission comprising a first spatial stream communicated with horizontal-polarization via a first dual-polarization RH, and a second spatial stream communicated with vertical-polarization via a second dual-polarization RH.

Example 2 includes the subject matter of Example 1, and optionally, wherein the baseband controller is configured to provide a first control indication to the first dual-polarization RH, and to provide a second control indication to the second dual-polarization RH, the first control indication to indicate that the first dual-polarization RH is to communicate the first spatial stream with horizontal-polarization via one or more dual-polarization antenna elements of the first dual-polarization RH, the second control indication is to indicate that the second dual-polarization RH is to communicate the second spatial stream with vertical-polarization via one or more dual-polarization antenna elements of the second dual-polarization RH.

Example 3 includes the subject matter of Example 1 or 2, and optionally, wherein the baseband controller is configured to control the first dual-polarization RH to transmit the first spatial stream with horizontal-polarization via one or more dual-polarization antenna elements of the first dual-polarization RH, and to control the second dual-polarization RH to transmit the second spatial stream with vertical-polarization via one or more dual-polarization antenna elements of the second dual-polarization RH.

Example 4 includes the subject matter of Example 1 or 2, and optionally, wherein the baseband controller is configured to control the first dual-polarization RH to receive the first spatial stream with horizontal-polarization via one or more dual-polarization antenna elements of the first dual-polarization RH, and to control the second dual-polarization RH to receive the second spatial stream with vertical-polarization via one or more dual-polarization antenna elements of the second dual-polarization RH.

Example 5 includes the subject matter of any one of Examples 1-4, and optionally, wherein the baseband controller is configured to control a dual-polarization RH of the first and second dual-polarization RHs to process a received transmission according to a polarization diversity reception mode by combining vertical-polarization signals from one or more dual-polarization antenna elements of the dual-polarization RH, and horizontal-polarization signals from the one or more dual-polarization antenna elements of the dual-polarization RH.

Example 6 includes the subject matter of any one of Examples 1-5, and optionally, wherein the baseband controller is configured to control the first dual-polarization RH to communicate a first spatial stream of an other MIMO transmission with vertical-polarization via one or more dual-polarization antenna elements of the first dual-polarization RH, and to control the second dual-polarization RH to communicate a second spatial stream of the other MIMO transmission with horizontal-polarization via one or more dual-polarization antenna elements of the second dual-polarization RH.

Example 7 includes the subject matter of any one of Examples 1-6, and optionally, wherein the baseband controller is configured to select, based on at least one predefined polarization criterion, which of the plurality of RHs is to be controlled as the first dual-polarization RH to communicate with horizontal-polarization, and which of the plurality of RHs is to be controlled as the second dual-polarization RH to communicate with vertical-polarization.

Example 8 includes the subject matter of any one of Examples 1-7, and optionally, wherein the baseband controller is configured to determine a selected dual-polarization RH of the plurality of dual-polarization RHs to communicate a Single-Input-Single-Output (SISO) transmission, wherein the baseband controller is configured to control the selected dual-polarization RH to communicate the SISO transmission with a selected polarization of the horizontal-polarization and the vertical-polarization.

Example 9 includes the subject matter of Example 8, and optionally, wherein the baseband controller is configured to determine the selected dual-polarization RH from the plurality of dual-polarization RHs based on a Signal to Noise Ratio (SNR) criterion corresponding to communication via the plurality of dual-polarization RHs.

Example 10 includes the subject matter of Example 8 or 9, and optionally, wherein the baseband controller is configured to determine the selected polarization mode based on a Signal to Noise Ratio (SNR) criterion corresponding to communications with the vertical-polarization mode and the horizontal-polarization mode.

Example 11 includes the subject matter of any one of Examples 1-10, and optionally, wherein the dual-polarization switch comprises a Transmit (Tx) amplifier configured to amplify a Tx signal to be transmitted via the dual-polarization antenna element; a receive (Rx) amplifier configured to amplify an Rx signal from the dual-polarization antenna element; a transceiver-amplifier switch configured to switch between a plurality of transceiver-amplifier connections comprising a first transceiver-amplifier connection between the transceiver and the Tx amplifier, and a second transceiver-amplifier connection between the transceiver and the Rx amplifier; and an amplifier-antenna switch configured to switch between a plurality of amplifier antenna connections comprising a first connection between the Tx amplifier and the horizontal-polarization port of the dual-polarization antenna element, a second connection between the Tx amplifier and the vertical-polarization port of the dual-polarization antenna element, a third connection between the Rx amplifier and the horizontal-polarization port of the dual-polarization antenna element, and a fourth connection between the Rx amplifier and the vertical-polarization port of the dual-polarization antenna element.

Example 12 includes the subject matter of Example 11, and optionally, wherein the Tx amplifier comprises a Power Amplifier (PA), and the Rx amplifier comprises a Low Noise Amplifier (LNA).

Example 13 includes the subject matter of any one of Examples 1-10, and optionally, wherein the dual-polarization switch comprises a Transmit (Tx) amplifier configured to amplify a Tx signal to be transmitted via the dual-polarization antenna element; a first Receive (Rx) amplifier configured to amplify a horizontal-polarization Rx signal from the horizontal-polarization port of the dual-polarization antenna element; a second Rx amplifier configured to amplify a vertical-polarization Rx signal from the vertical-polarization port of the dual-polarization antenna element; a transceiver-amplifier switch configured to switch between a plurality of transceiver-amplifier connections comprising a first transceiver-amplifier connection between the transceiver and the Tx amplifier, a second transceiver-amplifier connection between the transceiver and the first Rx amplifier, and a third transceiver-amplifier connection between the transceiver and the second Rx amplifier; and an amplifier-antenna switch configured to switch between a plurality of amplifier antenna connections comprising a first connection between the Tx amplifier and the horizontal-polarization port of the dual-polarization antenna element, a second connection between the Tx amplifier and the vertical-polarization port of the dual-polarization antenna element, a third connection between the first Rx amplifier and the horizontal-polarization port of the dual-polarization antenna element, and a fourth connection between the second Rx amplifier and the vertical-polarization port of the dual-polarization antenna element.

Example 14 includes the subject matter of any one of Examples 1-10, and optionally, wherein the dual-polarization switch comprises a Transmit (Tx) amplifier configured to amplify a Tx signal to be transmitted via the dual-polarization antenna element; a first Receive (Rx) amplifier configured to amplify a horizontal-polarization Rx signal from the horizontal-polarization port of the dual-polarization antenna element; a second Rx amplifier configured to amplify a vertical-polarization Rx signal from the vertical-polarization port of the dual-polarization antenna element; a transceiver-amplifier switch configured to switch between a plurality of transceiver-amplifier connections comprising a first transceiver-amplifier connection between the transceiver and the Tx amplifier, and a second transceiver-amplifier connection between the transceiver and at least one of the first Rx amplifier or the second Rx amplifier; and an amplifier-antenna switch configured to switch between a plurality of amplifier antenna connections comprising a first connection between the Tx amplifier and the horizontal-polarization port of the dual-polarization antenna element, a second connection between the Tx amplifier and the vertical-polarization port of the dual-polarization antenna element, and a third connection between the first Rx amplifier and the horizontal-polarization port of the dual-polarization antenna element and between the second Rx amplifier and the vertical-polarization port of the dual-polarization antenna element.

Example 15 includes the subject matter of Example 13 or 14, and optionally, wherein the Tx amplifier comprises a Power Amplifier (PA), the first Rx amplifier comprises a first Low Noise Amplifier (LNA), and the second Rx amplifier comprises a second LNA.

Example 16 includes the subject matter of any one of Examples 1-15, and optionally, wherein the dual-polarization RH comprises a phased array antenna comprising the plurality of dual-polarization antenna elements; and a beamformer configured to form a beam to communicate via the phased array antenna.

Example 17 includes the subject matter of Example 16, and optionally, wherein the dual-polarization RH comprises a first analog beamformer to form a first beam to receive vertical-polarization signals from the phased array antenna; and a second analog beamformer to form a second beam to receive horizontal-polarization signals from the phased array antenna.

Example 18 includes the subject matter of any one of Examples 1-15, and optionally, wherein the dual-polarization RH comprises a non-phased array antenna comprising the plurality of dual-polarization antenna elements.

Example 19 includes the subject matter of any one of Examples 1-18, and optionally, wherein the baseband controller comprises an interface to communicate the plurality of spatial streams with the plurality of dual-polarization RHs; and a controller configured to control the plurality of dual-polarization RHs to communicate the MIMO transmission.

Example 20 includes an apparatus comprising a baseband controller configured to control a plurality of dual-polarization Radio Heads (RHs) to communicate a Multiple-Input-Multiple-Output (MIMO) transmission, the baseband controller comprising an interface to communicate a plurality of spatial streams of the MIMO transmission with the plurality of dual-polarization RHs, respectively; and a controller configured to control a first dual-polarization RH of the plurality of dual-polarization RHs to communicate a first spatial stream of the MIMO transmission with a horizontal-polarization via one or more first dual-polarization antenna elements of the first dual-polarization RH, and to control a second dual-polarization RH of the plurality of dual-polarization RHs to communicate a second spatial stream of the MIMO transmission with a vertical-polarization via one or more second dual-polarization antenna elements of the second dual-polarization RH.

Example 21 includes the subject matter of Example 20, and optionally, wherein the baseband controller is configured to control the first dual-polarization RH to transmit the first spatial stream with horizontal-polarization via the one or more dual-polarization antenna elements of the first dual-polarization RH, and to control the second dual-polarization RH to transmit the second spatial stream with vertical-polarization via the one or more dual-polarization antenna elements of the second dual-polarization RH.

Example 22 includes the subject matter of Example 20, and optionally, wherein the baseband controller is configured to control the first dual-polarization RH to receive the first spatial stream with horizontal-polarization via the one or more dual-polarization antenna elements of the first dual-polarization RH, and to control the second dual-polarization RH to receive the second spatial stream with vertical-polarization via the one or more dual-polarization antenna elements of the second dual-polarization RH.

Example 23 includes the subject matter of any one of Examples 20-22, and optionally, wherein the baseband controller is configured to control a dual-polarization RH of the first and second dual-polarization RHs to process a received transmission according to a polarization diversity reception mode by combining vertical-polarization signals from one or more dual-polarization antenna elements of the dual-polarization RH, and horizontal-polarization signals from the one or more dual-polarization antenna elements of the dual-polarization RH.

Example 24 includes the subject matter of any one of Examples 20-23, and optionally, wherein the baseband controller is configured to control the first dual-polarization RH to communicate a first spatial stream of an other MIMO transmission with vertical-polarization via the one or more dual-polarization antenna elements of the first dual-polarization RH, and to control the second dual-polarization RH to communicate a second spatial stream of the other MIMO transmission with vertical-polarization via the one or more second dual-polarization antenna elements of the second dual-polarization RH.

Example 25 includes the subject matter of any one of Examples 20-24, and optionally, wherein the baseband controller is configured to select, based on at least one predefined polarization criterion, which of the plurality of RHs is to be controlled as the first dual-polarization RH to communicate with horizontal-polarization, and which of the plurality of RHs is to be controlled as the second dual-polarization RH to communicate with vertical-polarization.

Example 26 includes the subject matter of any one of Examples 20-25, and optionally, wherein the baseband controller is configured to determine a selected dual-polarization RH of the plurality of dual-polarization RHs to communicate a Single-Input-Single-Output (SISO) transmission, wherein the baseband controller is configured to control the selected dual-polarization RH to communicate the SISO transmission with a selected polarization of the horizontal-polarization and the vertical-polarization.

Example 27 includes the subject matter of Example 26, and optionally, wherein the baseband controller is configured to determine the selected dual-polarization RH from the plurality of dual-polarization RHs based on a Signal to Noise Ratio (SNR) criterion corresponding to communication via the plurality of dual-polarization RHs.

Example 28 includes the subject matter of Example 26 or 27, and optionally, wherein the baseband controller is configured to determine the selected polarization mode based on a Signal to Noise Ratio (SNR) criterion corresponding to communications with the vertical-polarization mode and the horizontal-polarization mode.

Example 29 comprises an apparatus comprising means for executing any of the described operations of Examples 1-28.

Example 30 comprises a product comprising one or more tangible computer-readable non-transitory storage media comprising computer-executable instructions operable to, when executed by at least one processor, enable the at least one processor to cause a device to perform any of the described operations of Examples 1-28.

Example 31 comprises an apparatus comprising: a memory interface; and processing circuitry configured to: perform any of the described operations of Examples 1-28.

Example 32 comprises a method comprising any of the described operations of Examples 1-28.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a plurality of dual-polarization Radio Heads (RHs), a dual-polarization RH of the plurality of dual-polarization RHs comprising:
a transceiver;
a plurality of dual-polarization antenna elements, a dual-polarization antenna element of the plurality of dual-polarization antenna elements comprising a vertical-polarization port and a horizontal-polarization port; and
a plurality of dual-polarization switches, wherein a dual-polarization switch of the plurality of dual-polarization switches is to route a vertical-polarization transmission between the transceiver and the vertical-polarization port of the dual-polarization antenna element, and to route a horizontal-polarization transmission between the transceiver and the horizontal-polarization port of the dual-polarization antenna element; and
a baseband controller configured to control the plurality of dual-polarization RHs to communicate a Multiple-Input-Multiple-Output (MIMO) transmission comprising a first spatial stream communicated with horizontal-polarization via a first dual-polarization RH, and a second spatial stream communicated with vertical-polarization via a second dual-polarization RH.

2. The apparatus of claim 1, wherein the baseband controller is configured to provide a first control indication to the first dual-polarization RH, and to provide a second control indication to the second dual-polarization RH, the first control indication to indicate that the first dual-polarization RH is to communicate the first spatial stream with horizontal-polarization via one or more dual-polarization antenna elements of the first dual-polarization RH, the second control indication is to indicate that the second dual-polarization RH is to communicate the second spatial stream with vertical-polarization via one or more dual-polarization antenna elements of the second dual-polarization RH.

3. The apparatus of claim 1, wherein the baseband controller is configured to control the first dual-polarization RH to transmit the first spatial stream with horizontal-polarization via one or more dual-polarization antenna elements of the first dual-polarization RH, and to control the second dual-polarization RH to transmit the second spatial stream with vertical-polarization via one or more dual-polarization antenna elements of the second dual-polarization RH.

4. The apparatus of claim 1, wherein the baseband controller is configured to control the first dual-polarization RH to receive the first spatial stream with horizontal-polarization via one or more dual-polarization antenna elements of the first dual-polarization RH, and to control the second dual-polarization RH to receive the second spatial stream with vertical-polarization via one or more dual-polarization antenna elements of the second dual-polarization RH.

5. The apparatus of claim 1, wherein the baseband controller is configured to control a dual-polarization RH of the first and second dual-polarization RHs to process a received transmission according to a polarization diversity reception mode by combining vertical-polarization signals from one or more dual-polarization antenna elements of the dual-polarization RH, and horizontal-polarization signals from the one or more dual-polarization antenna elements of the dual-polarization RH.

6. The apparatus of claim 1, wherein the baseband controller is configured to control the first dual-polarization RH to communicate a first spatial stream of an other MIMO transmission with vertical-polarization via one or more dual-polarization antenna elements of the first dual-polarization RH, and to control the second dual-polarization RH to communicate a second spatial stream of the other MIMO transmission with horizontal-polarization via one or more dual-polarization antenna elements of the second dual-polarization RH.

7. The apparatus of claim 1, wherein the baseband controller is configured to select, based on at least one predefined polarization criterion, which of the plurality of RHs is to be controlled as the first dual-polarization RH to communicate with horizontal-polarization, and which of the plurality of RHs is to be controlled as the second dual-polarization RH to communicate with vertical-polarization.

8. The apparatus of claim 1, wherein the baseband controller is configured to determine a selected dual-polarization RH of the plurality of dual-polarization RHs to communicate a Single-Input-Single-Output (SISO) transmission, wherein the baseband controller is configured to control the selected dual-polarization RH to communicate the SISO transmission with a selected polarization of the horizontal-polarization and the vertical-polarization.

9. The apparatus of claim 8, wherein the baseband controller is configured to determine the selected dual-polarization RH from the plurality of dual-polarization RHs based on a Signal to Noise Ratio (SNR) criterion corresponding to communication via the plurality of dual-polarization RHs.

10. The apparatus of claim 8, wherein the baseband controller is configured to determine the selected polarization based on a Signal to Noise Ratio (SNR) criterion corresponding to communications with the vertical-polarization and the horizontal-polarization.

11. The apparatus of claim 1, wherein the dual-polarization switch comprises:
a Transmit (Tx) amplifier configured to amplify a Tx signal to be transmitted via the dual-polarization antenna element;
a receive (Rx) amplifier configured to amplify an Rx signal from the dual-polarization antenna element;
a transceiver-amplifier switch configured to switch between a plurality of transceiver-amplifier connections comprising a first transceiver-amplifier connection between the transceiver and the Tx amplifier, and a second transceiver-amplifier connection between the transceiver and the Rx amplifier; and
an amplifier-antenna switch configured to switch between a plurality of amplifier-antenna connections comprising a first connection between the Tx amplifier and the horizontal-polarization port of the dual-polarization antenna element, a second connection between the Tx amplifier and the vertical-polarization port of the dual-polarization antenna element, a third connection between the Rx amplifier and the horizontal-polarization port of the dual-polarization antenna element, and a fourth connection between the Rx amplifier and the vertical-polarization port of the dual-polarization antenna element.

12. The apparatus of claim 1, wherein the dual-polarization switch comprises:
a Transmit (Tx) amplifier configured to amplify a Tx signal to be transmitted via the dual-polarization antenna element;
a first Receive (Rx) amplifier configured to amplify a horizontal-polarization Rx signal from the horizontal-polarization port of the dual-polarization antenna element;
a second Rx amplifier configured to amplify a vertical-polarization Rx signal from the vertical-polarization port of the dual-polarization antenna element;
a transceiver-amplifier switch configured to switch between a plurality of transceiver-amplifier connections comprising a first transceiver-amplifier connection between the transceiver and the Tx amplifier, a second transceiver-amplifier connection between the transceiver and the first Rx amplifier, and a third transceiver-amplifier connection between the transceiver and the second Rx amplifier; and
an amplifier-antenna switch configured to switch between a plurality of amplifier-antenna connections comprising a first connection between the Tx amplifier and the horizontal-polarization port of the dual-polarization antenna element, a second connection between the Tx amplifier and the vertical-polarization port of the dual-polarization antenna element, a third connection between the first Rx amplifier and the horizontal-polarization port of the dual-polarization antenna element, and a fourth connection between the second Rx amplifier and the vertical-polarization port of the dual-polarization antenna element.

13. The apparatus of claim 1, wherein the dual-polarization switch comprises:
a Transmit (Tx) amplifier configured to amplify a Tx signal to be transmitted via the dual-polarization antenna element;
a first Receive (Rx) amplifier configured to amplify a horizontal-polarization Rx signal from the horizontal-polarization port of the dual-polarization antenna element;
a second Rx amplifier configured to amplify a vertical-polarization Rx signal from the vertical-polarization port of the dual-polarization antenna element;
a transceiver-amplifier switch configured to switch between a plurality of transceiver-amplifier connections comprising a first transceiver-amplifier connection between the transceiver and the Tx amplifier, and a second transceiver-amplifier connection between the transceiver and at least one of the first Rx amplifier or the second Rx amplifier; and
an amplifier-antenna switch configured to switch between a plurality of amplifier-antenna connections comprising a first connection between the Tx amplifier and the horizontal-polarization port of the dual-polarization antenna element, a second connection between the Tx amplifier and the vertical-polarization port of the dual-polarization antenna element, and a third connection between the first Rx amplifier and the horizontal-polarization port of the dual-polarization antenna element and between the second Rx amplifier and the vertical-polarization port of the dual-polarization antenna element.

14. The apparatus of claim 1, wherein the dual-polarization RH comprises:
a phased array antenna comprising the plurality of dual-polarization antenna elements; and
a beamformer configured to form a beam to communicate via the phased array antenna.

15. The apparatus of claim 14, wherein the dual-polarization RH comprises:
a first analog beamformer to form a first beam to receive vertical-polarization signals from the phased array antenna; and
a second analog beamformer to form a second beam to receive horizontal-polarization signals from the phased array antenna.

16. The apparatus of claim 1 comprising a wireless communication device, the wireless communication device comprising a memory, and a processor to execute instructions of an operating system.

17. An apparatus comprising:
a baseband controller configured to control a plurality of dual-polarization Radio Heads (RHs) of a wireless communication device to communicate a Multiple-Input-Multiple-Output (MIMO) transmission, the baseband controller comprising:
an interface to communicate a plurality of spatial streams of the MIMO transmission with the plurality of dual-polarization RHs, respectively; and
a controller configured to control a first dual-polarization RH of the plurality of dual-polarization RHs to communicate a first spatial stream of the MIMO transmission with a horizontal-polarization via one or more first dual-polarization antenna elements of the first dual-polarization RH, and to control a second dual-polarization RH of the plurality of dual-polarization RHs to communicate a second spatial stream of the MIMO transmission with a vertical-polarization via one or more second dual-polarization antenna elements of the second dual-polarization RH, wherein the controller is configured to provide first control signals to the first dual-polarization RH to control the first dual-polarization RH to use the horizontal-polarization for communication of the first spatial stream of the MIMO transmission, wherein the controller is configured to provide second control signals to the second dual-polarization RH to control the second dual-polarization RH to use the vertical-polarization for communication of the second spatial stream of the MIMO transmission.

18. The apparatus of claim 17, wherein the baseband controller is configured to control the first dual-polarization RH to transmit the first spatial stream with horizontal-polarization via the one or more first dual-polarization antenna elements of the first dual-polarization RH, and to control the second dual-polarization RH to transmit the second spatial stream with vertical-polarization via the one or more second dual-polarization antenna elements of the second dual-polarization RH.

19. The apparatus of claim 17, wherein the baseband controller is configured to control the first dual-polarization RH to receive the first spatial stream with horizontal-polarization via the one or more first dual-polarization antenna elements of the first dual-polarization RH, and to control the second dual-polarization RH to receive the second spatial stream with vertical-polarization via the one or more second dual-polarization antenna elements of the second dual-polarization RH.

20. The apparatus of claim 17, wherein the baseband controller is configured to control a dual-polarization RH of the first and second dual-polarization RHs to process a received transmission according to a polarization diversity reception mode by combining vertical-polarization signals from one or more dual-polarization antenna elements of the dual-polarization RH, and horizontal-polarization signals from the one or more dual-polarization antenna elements of the dual-polarization RH.

21. The apparatus of claim 17, wherein the baseband controller is configured to control the first dual-polarization RH to communicate a first spatial stream of an other MIMO transmission with vertical-polarization via the one or more first dual-polarization antenna elements of the first dual-polarization RH, and to control the second dual-polarization RH to communicate a second spatial stream of the other MIMO transmission with vertical-polarization via the one or more second dual-polarization antenna elements of the second dual-polarization RH.

22. The apparatus of claim 17, wherein the baseband controller is configured to select, based on at least one predefined polarization criterion, which of the plurality of RHs is to be controlled as the first dual-polarization RH to communicate with horizontal-polarization, and which of the plurality of RHs is to be controlled as the second dual-polarization RH to communicate with vertical-polarization.

23. The apparatus of claim 17, wherein the baseband controller is configured to determine a selected dual-polarization RH of the plurality of dual-polarization RHs to communicate a Single-Input-Single-Output (SISO) transmission, wherein the baseband controller is configured to control the selected dual-polarization RH to communicate the SISO transmission with a selected polarization of the horizontal-polarization and the vertical-polarization.

24. A product comprising one or more tangible computer-readable non-transitory storage media comprising computer-executable instructions operable to, when executed by at least one processor, enable the at least one processor to cause a baseband controller to control a plurality of dual-polarization Radio Heads (RHs) of a wireless communication device to communicate a Multiple-Input-Multiple-Output (MIMO) transmission, the instructions, when executed, cause the baseband controller to:
control a first dual-polarization RH of the plurality of dual-polarization RHs to communicate a first spatial stream of the MIMO transmission with a horizontal-polarization via one or more first dual-polarization antenna elements of the first dual-polarization RH; and
control a second dual-polarization RH of the plurality of dual-polarization RHs to communicate a second spatial stream of the MIMO transmission with a vertical-polarization via one or more second dual-polarization antenna elements of the second dual-polarization RH,
wherein the instructions, when executed, cause the baseband controller to provide first control signals to the first dual-polarization RH to control the first dual-polarization RH to use the horizontal-polarization for communication of the first spatial stream of the MIMO transmission, and to provide second control signals to the second dual-polarization RH to control the second dual-polarization RH to use the vertical-polarization for communication of the second spatial stream of the MIMO transmission.

25. The product of claim 24, wherein the instructions, when executed cause the baseband controller to select, based on at least one predefined polarization criterion, which of the plurality of RHs is to be controlled as the first dual-polarization RH to communicate with horizontal-polarization, and which of the plurality of RHs is to be controlled as the second dual-polarization RH to communicate with vertical-polarization.

\* \* \* \* \*